(12) United States Patent
So

(10) Patent No.: US 12,652,536 B2
(45) Date of Patent: Jun. 9, 2026

(54) APPARATUS AND METHOD OF COORDINATING A REAUTHENTICATION/REAUTHORIZATION PROCEDURE FOR ACCESS TO UNCREWED AERIAL SERVICES

(71) Applicant: INNOPEAK TECHNOLOGY, INC.

(72) Inventor: Tricci So, Palo Alto, CA (US)

(73) Assignee: INNOPEAK TECHNOLOGY, INC., Palo Alto, CA (US)

( * ) Notice: Subject to any disclaimer, the term of this patent is extended or adjusted under 35 U.S.C. 154(b) by 308 days.

(21) Appl. No.: 18/476,174

(22) Filed: Sep. 27, 2023

(65) Prior Publication Data

US 2024/0022907 A1     Jan. 18, 2024

Related U.S. Application Data

(63) Continuation of application No. PCT/US2022/022140, filed on Mar. 28, 2022.
(Continued)

(51) Int. Cl.
*H04W 12/065* (2021.01)
*H04W 60/00* (2009.01)

(52) U.S. Cl.
CPC ......... *H04W 12/065* (2021.01); *H04W 60/00* (2013.01)

(58) Field of Classification Search
CPC ..... H04W 12/065; H04W 60/00; H04W 4/40; H04W 12/37; H04W 12/71
See application file for complete search history.

(56) References Cited

U.S. PATENT DOCUMENTS

2019/0278897 A1   9/2019   Zhang et al.
2020/0267554 A1   8/2020   Faccin et al.
(Continued)

FOREIGN PATENT DOCUMENTS

WO         2020146076 A1     7/2020
WO     WO-2021195900 A1 *  10/2021    .......... H04W 12/108
(Continued)

OTHER PUBLICATIONS

A. Alsoliman, A. B. Rabiah and M. Levorato, "Privacy-Preserving Authentication Framework for UAS Traffic Management Systems," 2020 4th Cyber Security in Networking Conference (CSNet), Lausanne, Switzerland, 2020, pp. 1-8, doi: 10.1109/CSNet50428.2020. 9265534. (Year: 2020).*
(Continued)

*Primary Examiner* — Charles T Shedrick
(74) *Attorney, Agent, or Firm* — Ladas & Parry, LLP

(57)     ABSTRACT

According to one aspect of the present disclosure, a method of wireless communication is provided. The method may include receiving, from a uncrewed aerial system (UAS) service (USS) network, a UAS reauthentication/reauthorization request after a user equipment (UE) is registered with the USS network by first operations associated with a first USS uncrewed aerial vehicle (UAV) authentication and authorization (UUAA) procedure. The method may include identifying a network function (NF) element type associated with a UAS reauthentication/reauthorization procedure based on UE UUAA context information. The method may include sending a UE context management request that indicates the NF element type. The method may include receiving a UE context management response that includes an NF identification (ID) of a serving NF element. The method may include sending a UAS reauthentication/reau-
(Continued)

thorization notification instructing the serving NF to initiate a second UUAA procedure.

18 Claims, 11 Drawing Sheets

Related U.S. Application Data

(60) Provisional application No. 63/168,232, filed on Mar. 30, 2021.

(56) References Cited

U.S. PATENT DOCUMENTS

| | | | |
|---|---|---|---|
| 2021/0076202 A1 | 3/2021 | Park et al. | |
| 2021/0099870 A1* | 4/2021 | Moon | H04W 12/06 |
| 2022/0272533 A1* | 8/2022 | Lei | H04W 12/08 |
| 2023/0014494 A1* | 1/2023 | Lei | H04W 12/71 |
| 2023/0156464 A1* | 5/2023 | Faccin | H04W 60/00 |
| | | | 380/270 |
| 2025/0029503 A1* | 1/2025 | Pateromichelakis | G08G 5/56 |
| 2025/0126033 A1* | 4/2025 | Kim | H04L 69/322 |

FOREIGN PATENT DOCUMENTS

| | | | | |
|---|---|---|---|---|
| WO | WO-2022072688 A1 * | 4/2022 | | H04W 76/18 |
| WO | 2022149104 A1 | 7/2022 | | |
| WO | 2022212252 A1 | 10/2022 | | |

OTHER PUBLICATIONS

First Office Action of the European patent application No. 22781955.4, issued on Mar. 25, 2025.

"3rd Generation Partnership Project; Technical Specification Group Services and System Aspects; Study on supporting Unmanned Aerial Systems (UAS) connectivity, Identification and tracking(Release 17)"; 3 GPP TR 23.754 v2.0.0; Nov. 30, 2020.

Nokia:"Comments on contribution S3-161789 that proposes secondary authentication in the slice as the only means of authenticating UE's access to a network slice"; 3 GPP TSG SA WG3 (Security) Meeting # 85; S3-161961; Santa Cruz de Tenerife; Nov. 6, 2016.

European Search Report issued on Aug. 8, 2024 for the corresponding European Patent Application No. 22781955.4.

Dinh et al.,"Unmanned aerial system-assisted wilderness search and rescue mission," International Journal of Distributed Sensor Networks 15.6 (2019);1550147719850719.Jun. 18, 2019 (Jun. 18, 2019) Retrieved on May 14, 2022 (May 14, 2022) from <https://journals.sagepub.com/doi/full/10.1177/1550147719850719>, entire document.

International Search Report, International Application No. PCT/US2022/022140, mailed Jun. 14, 2022.

Written Opinion of the International Searching Authority in International Application No. PCT/US2022/022140 mailed Jun. 14, 2022.

* cited by examiner

<u>100</u>

200

300

400

500

600

APPARATUS AND METHOD OF COORDINATING A REAUTHENTICATION/REAUTHORIZATION PROCEDURE FOR ACCESS TO UNCREWED AERIAL SERVICES

CROSS-REFERENCE TO RELATED APPLICATIONS

The present disclosure is a continuation of PCT Patent Application No. PCT/US2022/022140, filed on Mar. 28, 2022, which claims benefit of and priority to U.S. Provisional Application No. 63/168,232, entitled "Support for UUAA Re-authentication and Reauthorization Procedures in 5G System," filed on Mar. 30, 2021, the disclosures of which are incorporated by reference herein in their entireties.

BACKGROUND

Embodiments of the present disclosure relate to apparatus and method for wireless communication.

Wireless communication systems are widely deployed to provide various telecommunication services such as telephony, video, data, messaging, and broadcasts. In cellular communication, such as the 4th-generation (4G) Long Term Evolution (LTE) and the 5th-generation (5G) New Radio (NR), the 3rd Generation Partnership Project (3GPP) defines various mechanisms for registering a user equipment (UE) for access to various subscription-based services.

SUMMARY

According to one aspect of the present disclosure, a method of wireless communication of a network element is provided. The method may include receiving, from an uncrewed aerial system (UAS) service (USS) network, a UAS reauthentication/reauthorization request after a user equipment (UE) is registered with a USS network by first operations associated with a first USS uncrewed aerial vehicle (UAV) authentication and authorization (UUAA) procedure. The method may include, in response to receiving the UAS reauthentication/reauthorization request, identifying a network function (NF) element type for a UAS reauthentication/reauthorization procedure based on UE UUAA context information associated with the first UUAA procedure. The method may include sending, to a unified data management (UDM), a UE context management request that indicates the NF element type associated with the UAS reauthentication/reauthorization procedure. The method may include receiving, from the UDM, a UE context management response that includes an NF identification (ID) of a serving NF element associated with the UE. The serving NF element may be of the NF element type. The method may include sending, to the serving NF element, a UAS reauthentication/reauthorization notification instructing the serving NF element to initiate a second UUAA procedure to register the UE with the USS network.

According to another aspect of the present disclosure, an apparatus for wireless communication of a network element is provided. The apparatus may include one or more processors. The apparatus may include memory having instructions stored thereon, which when executed by the one or more processors cause the processors to perform receiving, from a USS network, a UAS reauthentication/reauthorization request after a UE is registered with a USS network by first operations associated with a first UUAA procedure. The apparatus may include memory having instructions stored thereon, which when executed by the one or more processors cause the processors to perform, in response to receiving the UAS reauthentication/reauthorization request, identifying an NF element type for a UAS reauthentication/reauthorization procedure based on UE UUAA context information associated with the first UUAA procedure. The apparatus may include memory having instructions stored thereon, which when executed by the one or more processors cause the processors to perform sending, to a UDM, a UE context management request that indicates the NF element type associated with the UAS reauthentication/reauthorization procedure. The apparatus may include memory having instructions stored thereon, which when executed by the one or more processors cause the processors to perform receiving, from the UDM, a UE context management response that includes an NF ID associated with a serving NF element associated with the UE. The serving NF element may be the NF element type. The apparatus may include memory having instructions stored thereon, which when executed by the one or more processors cause the processors to perform sending, to the serving NF element, a UAS reauthentication/reauthorization notification instructing the serving NF element to initiate a second UUAA procedure to register the UE with the USS network.

According to still another aspect of the present disclosure, a non-transitory computer-readable medium is disclosed. The non-transitory computer-readable medium has instructions stored thereon, which when executed by one or more processors may cause the one or more processors to perform receiving, from a USS network, a UAS reauthentication/reauthorization request after a UE is registered with a USS network by first operations associated with a first UUAA procedure. The non-transitory computer-readable medium has instructions stored thereon, which when executed by one or more processors may cause the one or more processors to perform, in response to receiving the UAS reauthentication/reauthorization request, identifying an NF element type for a UAS reauthentication/reauthorization procedure based on UE UUAA context information associated with the first UUAA procedure. The non-transitory computer-readable medium has instructions stored thereon, which when executed by one or more processors may cause the one or more processors to perform sending, to a UDM, a UE context management request that indicates the NF element type associated with the UAS reauthentication/reauthorization procedure. The non-transitory computer-readable medium has instructions stored thereon, which when executed by one or more processors may cause the one or more processors to perform receiving, from the UDM, a UE context management response that includes an NF ID of a serving NF element associated with the UE. The serving NF element may be of the NF element type. The non-transitory computer-readable medium has instructions stored thereon, which when executed by one or more processors may cause the one or more processors to perform sending, to the serving NF element, a UAS reauthentication/reauthorization notification instructing the serving NF element to initiate a second UUAA procedure to register the UE with the USS network.

These illustrative embodiments are mentioned not to limit or define the present disclosure, but to provide examples to aid understanding thereof. Additional embodiments are discussed in the Detailed Description, and further description is provided there.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

Figure 1:
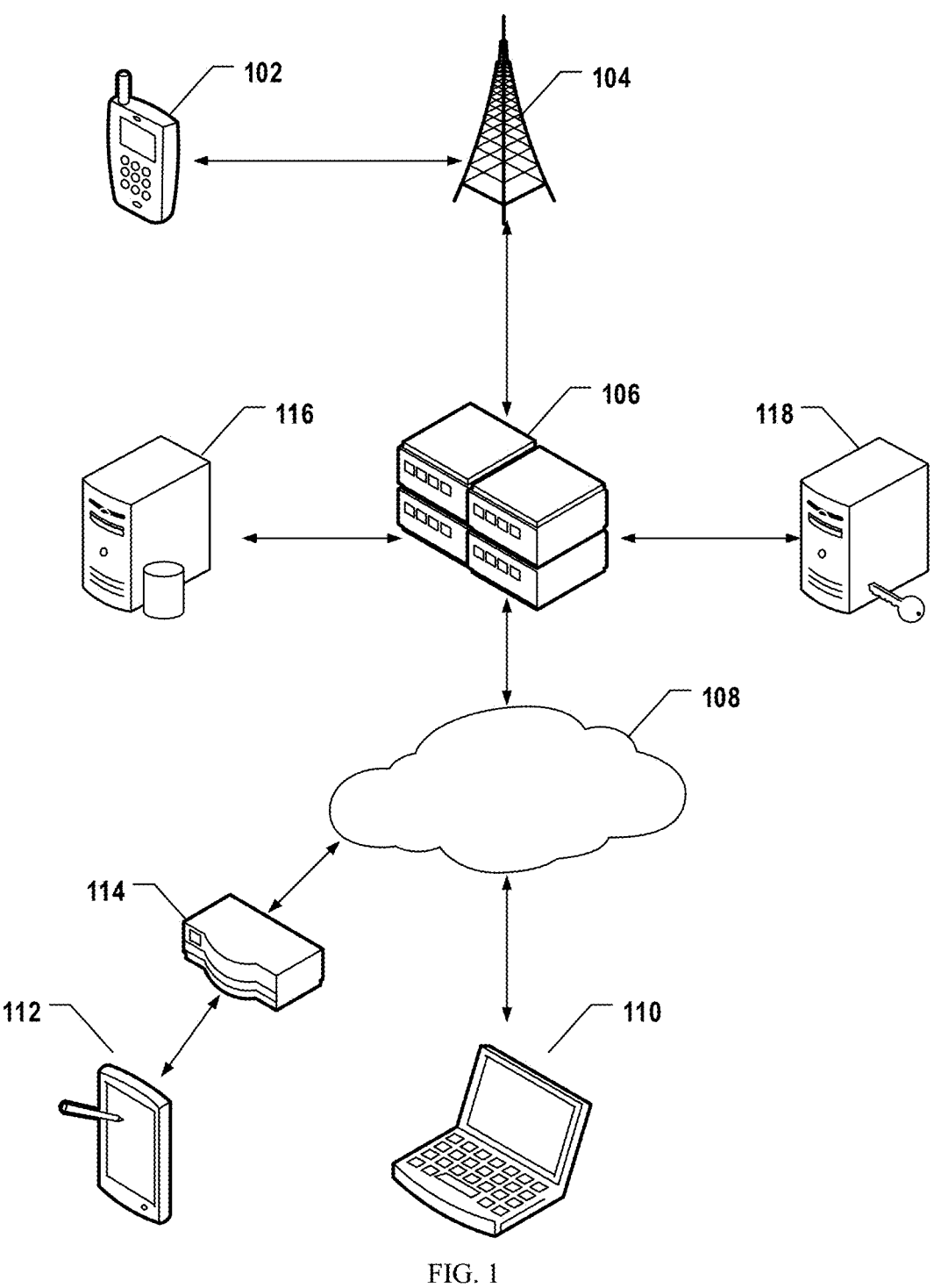
FIG. 1 illustrates an exemplary wireless network, according to some embodiments of the present disclosure.

Embodiments of the present disclosure will be described with reference to the accompanying drawings.

DETAILED DESCRIPTION

Although some configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various aspects of wireless communication systems will now be described with reference to various apparatus and methods. These apparatus and methods will be described in the following detailed description and illustrated in the accompanying drawings by various blocks, modules, units, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

The techniques described herein may be used for various wireless communication networks, such as code division multiple access (CDMA) system, time division multiple access (TDMA) system, frequency division multiple access (FDMA) system, orthogonal frequency division multiple access (OFDMA) system, single-carrier frequency division multiple access (SC-FDMA) system, wireless local area network (WLAN) system, and other networks. The terms "network" and "system" are often used interchangeably. A CDMA network may implement a radio access technology (RAT), such as Universal Terrestrial Radio Access (UTRA), evolved UTRA (E-UTRA), CDMA 2000, etc. A TDMA network may implement a RAT, such as the Global System for Mobile Communications (GSM). An OFDMA network may implement a RAT, such as LTE or NR. A WLAN system may implement a RAT, such as Wi-Fi. The techniques described herein may be used for the wireless networks and RATs mentioned above, as well as other wireless networks and RATs.

In 5G NR, a network slice is a logical network customized to serve a defined service class (e.g., business purpose) or customer application. A network slice may include an end-to-end composition of all the varied network resources used to satisfy the performance and economic needs of that particular service class or customer application. Thus, network slicing offers a conceptual way of viewing and realizing service provider networks by building logical networks on top of a common and shared infrastructure layer, such as the 5G NR core network. Network slices may be created, changed, and removed by management and orchestration functions. By way of example, network slicing may be used by a service provider (e.g., Amazon) to establish a virtual service provider network over the infrastructure of a physical network operator (e.g., Verizon) through which a customer may access subscription-based services offered by the service provider.

In some instances, a service provider may provide uncrewed aerial services. Uncrewed aerial services may be used for, e.g., drone flight sessions, among other things. The UE of a subscribed user may access uncrewed aerial services once the UE has been registered with an access network and a network slice. An uncrewed aerial vehicle (UAV), which may be part of an uncrewed aerial system (UAS) that includes an uncrewed aerial controller (UAC), is one example of a UE that may access uncrewed aerial services. Uncrewed aerial services may be maintained by a UAV service supplier (USS) entity, for example.

When enabling the 5G mobile systems to support a UAS, the USS, which may also be the Third Party Authorized Entity (TPAE), may require the UAV to be authenticated and authorized by the 5G systems using a primary authorization procedure. Furthermore, the UAV may register with the USS before the uncrewed aerial services can be accessed. Registration with the USS may be implemented via a UUAA procedure. A UUAA procedure initiated during the UAV's primary registration with the access network may be referred to as a UUAA mobility management (MM) (UUAA-MM) procedure. On the other hand, a UUAA procedure initiated during protocol data unit (PDU) session establishment by the UAV may be referred to as a UUAA session mobility (UUAA-SM) procedure, for example.

For the case when the UAV executes the UUAA procedure during the primary registration with the access network, the UUAA Non-Access Stratum (NAS) termination point may be the access and mobility management function (AMF). For the case when the UAV executes the UUAA procedure during PDU session establishment, the UUAA NAS termination point may be the session management function (SMF).

Once a UAV is authenticated/authorized with the USS by the UUAA procedure, uncrewed aerial services may be accessed, and a flight session (or other UAV sessions) may commence. However, a flight session may have a limited lifetime for security reasons. In some instances, changes to the UAV service requirement may occur during a flight session. In either case, UAS reauthentication/reauthorization may be required by the USS. Unfortunately, there is no mechanism by which to perform UAS reauthentication/reauthorization initiated by a USS.

Thus, there exists an unmet need for a UAS reauthentication/reauthorization procedure that facilitates the reauthentication/reauthorization of a UAV with the USS to avoid disruption to ongoing uncrewed aerial services.

To overcome these and other challenges, the present disclosure provides an exemplary UAS reauthentication/reauthorization procedure that may be initiated by the USS. By way of example and not limitation, the USS may initiate the UAS reauthentication/reauthorization procedure at or near the expiry of the flight session, or when a change to a subscription service occurs. The exemplary UAS reauthentication/reauthorization procedure may enable the enforcement of USS security protocols as set by the service provider without disrupting an ongoing flight session. The exemplary UAS reauthentication/reauthorization procedure may identify the appropriate UUAA NAS termination point (e.g., AMF or SMF) based on whether the initial UUAA procedure was a UUAA-MM procedure or a UUAA-SM procedure. Moreover, the exemplary UAS reauthentication/reauthorization procedure described herein considers that when reauthentication/reauthorization is initiated, the UAV may be in an idle state in which no communication path between the UAV and the access network exists. When such a situation arises, the UAV may be paged, and a signaling communication path with the UUAA NAS termination point (also referred to herein as the "serving NF element") may be established before proceeding with the second UUAA procedure that registers (or maintains the registration) of the UAV with the USS. Additional details of the exemplary UAS reauthentication/reauthorization procedure are provided below in connection with FIGS. 1-12.

FIG. 1 illustrates an exemplary wireless network 100, in which some aspects of the present disclosure may be implemented, according to some embodiments of the present disclosure. As shown in FIG. 1, wireless network 100 may include a network of nodes, such as a user equipment (UE) 102, an access node 104, and a core network element 106. UE 102 may be any terminal device, such as a UAV (e.g., a drone or other uncrewed flying device), a mobile phone, a desktop computer, a laptop computer, a tablet, a vehicle computer, a gaming console, a printer, a positioning device, a wearable electronic device, a smart sensor, or any other device capable of receiving, processing, and transmitting information, such as any member of a vehicle to everything (V2X) network, a cluster network, a smart grid node, or an Internet-of-Things (IoT) node. It is understood that UE 102 is illustrated as a mobile phone simply by way of illustration and not by way of limitation.

Access node 104 (also referred to herein as "access network" or "radio access network (RAN)") may be a device that communicates with UE 102, such as a wireless access point, a base station (BS), aNode B, an enhanced Node B (eNodeB or eNB), a next-generation NodeB (gNodeB or gNB), a cluster master node, or the like. Access node 104 may have a wired connection to UE 102, a wireless connection to UE 102, or any combination thereof. Access node 104 may be connected to UE 102 by multiple connections, and UE 102 may be connected to other access nodes in addition to access node 104. Access node 104 may also be connected to other user equipments. When configured as a gNB, access node 104 may operate in millimeter wave (mmW) frequencies and/or near mmW frequencies in communication with the UE 102. When access node 104 operates in mmW or near mmW frequencies, the access node 104 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW or near mmW radio frequency band have extremely high path loss and a short range. The mmW base station may utilize beamforming with UE 102 to compensate for the extremely high path loss and short range. It is understood that access node 104 is illustrated by a radio tower by way of illustration and not by way of limitation.

Access nodes 104, which are collectively referred to as E-UTRAN in the evolved packet core network (EPC) and as NG-RAN in the 5G core network (5GC), interface with the EPC and 5GC through dedicated backhaul links (e.g., S1 interface). In addition to other functions, access node 104 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. Access nodes 104 may communicate directly or indirectly (e.g., through the 5GC) with each other over backhaul links (e.g., X2 interface). The backhaul links may be wired or wireless.

Core network element 106 may serve access node 104 and UE 102 to provide core network services. In some embodiments, core network element 106 includes a mobility management entity (MME), which may be part of an evolved packet core (EPC) for the LTE system. In some embodiments, core network element 106 may include an access and mobility management function (AMF), a session management function (SMF), or a user plane function (UPF), of a 5G core network (5GC) for the NR system. The AMF may be in communication with a Unified Data Management (UDM). The AMF is the control node that processes the signaling between the UE 102 and the 5GC. Generally, the AMF provides QoS flow and session management. All user Internet protocol (IP) packets are transferred through the UPF. The UPF provides UE IP address allocation as well as other functions. The UPF is connected to the IP Services. The IP Services may include the Internet, an intranet, an IP Multimedia Subsystem (IMS), a PS Streaming Service, and/or other IP services. It is understood that core network element 106 is shown as a set of rack-mounted servers by way of illustration and not by way of limitation. Additional examples of core network element 106 are depicted in FIGS. 3, 4, 5, 6A, and 6B. In some embodiments, core network element 106 may include one or more network elements.

Core network element 106 may connect with a large network, such as the Internet 108, or another Internet Protocol (IP) network, to communicate packet data over any distance. In this way, data from UE 102 may be communicated to other user equipments connected to other access points, including, for example, a computer 110 connected to Internet 108, for example, using a wired connection or a wireless connection, or to a tablet 112 wirelessly connected to Internet 108 via a router 114. Thus, computer 110 and tablet 112 provide additional examples of possible user equipments, and router 114 provides an example of another possible access node.

A generic example of a rack-mounted server is provided as an illustration of core network element 106. However, there may be multiple elements in the core network including database servers, such as a database 116, and security and authentication servers, such as an authentication server 118. Database 116 may, for example, manage data related to user subscription to network services. A home location register (HLR) is an example of a standardized database of subscriber information for a cellular network. Likewise, authentication server 118 may handle authentication of users, sessions, and so on. In the NR system, an authentication server function (AUSF) device may be the entity to perform user equipment authentication. In some embodiments, a single server rack may handle multiple such functions, such that the connections between core network element 106, authentication server 118, and database 116, may be local connections within a single rack.

Figure 2:
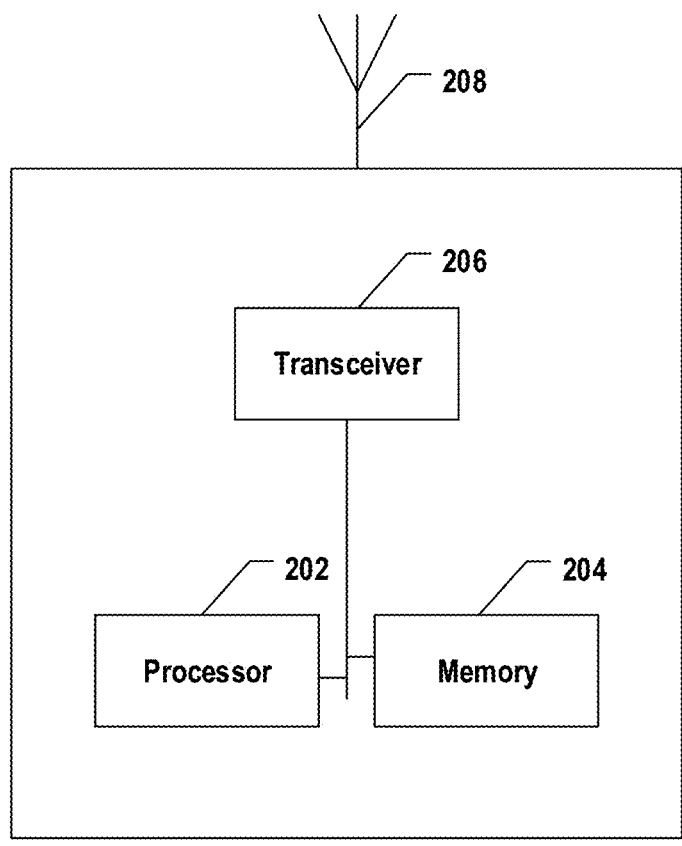
FIG. 2 illustrates a block diagram of an exemplary node, according to some embodiments of the present disclosure.

Each element in FIG. 1 may be considered a node of wireless network 100. More detail regarding the possible implementation of a node is provided by way of example in the description of a node 200 in FIG. 2. Node 200 may be configured as UE 102, access node 104, or core network element 106 in FIG. 1. Similarly, node 200 may also be configured as computer 110, router 114, tablet 112, database 116, or authentication server 118 in FIG. 1. As shown in FIG. 2, node 200 may include a processor 202, a memory 204, and a transceiver 206. These components are shown as connected to one another by a bus, but other connection types are also permitted. When node 200 is UE 102, additional components may also be included, such as a user interface (UI), sensors, and the like. Similarly, node 200 may be implemented as a blade in a server system when node 200 is configured as core network element 106. Other implementations are also possible.

Transceiver 206 may include any suitable device for sending and/or receiving data. Node 200 may include one or more transceivers, although only one transceiver 206 is shown for simplicity of illustration. An antenna 208 is shown as a possible communication mechanism for node 200. Multiple antennas and/or arrays of antennas may be utilized for receiving multiple spatially multiplex data streams. Additionally, examples of node 200 may communicate using wired techniques rather than (or in addition to) wireless techniques. For example, access node 104 may communicate wirelessly to UE 102 and may communicate by a wired connection (for example, by optical or coaxial cable) to core network element 106. Other communication hardware, such as a network interface card (NIC), may be included as well.

As shown in FIG. 2, node 200 may include processor 202. Although only one processor is shown, it is understood that multiple processors can be included. Processor 202 may include microprocessors, microcontroller units (MCUs), digital signal processors (DSPs), application-specific integrated circuits (ASICs), field-programmable gate arrays (FPGAs), programmable logic devices (PLDs), state machines, gated logic, discrete hardware circuits, and other suitable hardware configured to perform the various functions described throughout the present disclosure. Processor 202 may be a hardware device having one or more processing cores. Processor 202 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software can include computer instructions written in an interpreted language, a compiled language, or machine code. Other techniques for instructing hardware are also permitted under the broad category of software.

As shown in FIG. 2, node 200 may also include memory 204. Although only one memory is shown, it is understood that multiple memories can be included. Memory 204 can broadly include both memory and storage. For example, memory 204 may include random-access memory (RAM), read-only memory (ROM), static RAM (SRAM), dynamic RAM (DRAM), ferro-electric RAM (FRAM), electrically erasable programmable ROM (EEPROM), compact disc read-only memory (CD-ROM) or other optical disk storage, hard disk drive (HDD), such as magnetic disk storage or other magnetic storage devices, Flash drive, solid-state drive (SSD), or any other medium that can be used to carry or store desired program code in the form of instructions that can be accessed and executed by processor 202. Broadly, memory 204 may be embodied by any computer-readable medium, such as a non-transitory computer-readable medium.

Processor 202, memory 204, and transceiver 206 may be implemented in various forms in node 200 for performing wireless communication functions. In some embodiments, processor 202, memory 204, and transceiver 206 of node 200 are implemented (e.g., integrated) on one or more system-on-chips (SoCs). In one example, processor 202 and memory 204 may be integrated on an application processor (AP) SoC (sometimes known as a "host," referred to herein as a "host chip") that handles application processing in an operating system (OS) environment, including generating raw data to be transmitted. In another example, processor 202 and memory 204 may be integrated on a baseband processor (BP) SoC (sometimes known as a "modem," referred to herein as a "baseband chip") that converts the raw data, e.g., from the host chip, to signals that can be used to modulate the carrier frequency for transmission, and vice versa, which can run a real-time operating system (RTOS). In still another example, processor 202 and transceiver 206 (and memory 204 in some cases) may be integrated on an RF SoC (sometimes known as a "transceiver," referred to herein as an "RF chip") that transmits and receives RF signals with antenna 208. It is understood that in some examples, some or all of the host chip, baseband chip, and RF chip may be integrated as a single SoC. For example, a baseband chip and an RF chip may be integrated into a single SoC that manages all the radio functions for cellular communication.

Referring back to FIG. 1, core network element 106 may be configured to perform operations associated with the exemplary UAS reauthentication/reauthorization procedure described herein. For example, core network element 106 may receive, from a USS, a request for reauthentication/reauthorization of UE 102. The request may be received at or near the expiry of a flight session, or when service requirement changes occur, for example. Core network element 106 may identify the appropriate UUAA NAS termination point (e.g., AMF or SMF) based on whether the initial UUAA procedure was a UUAA-MM procedure or a UUAA-SM procedure. The UUAA NAS termination point may initiate and/or perform the UUAA procedure to reauthentication/reauthorize UE 102 with the USS. When UE 102 is in an idle mode, the UUAA NAS termination point initiates a network triggered service request to establish a signaling communication path therewith before initiating the UUAA procedure. Thus, the exemplary UAS reauthentication/reauthorization procedure may enable the enforcement of USS security protocols as set by the service provider without disrupting an ongoing flight session.

Figure 3:
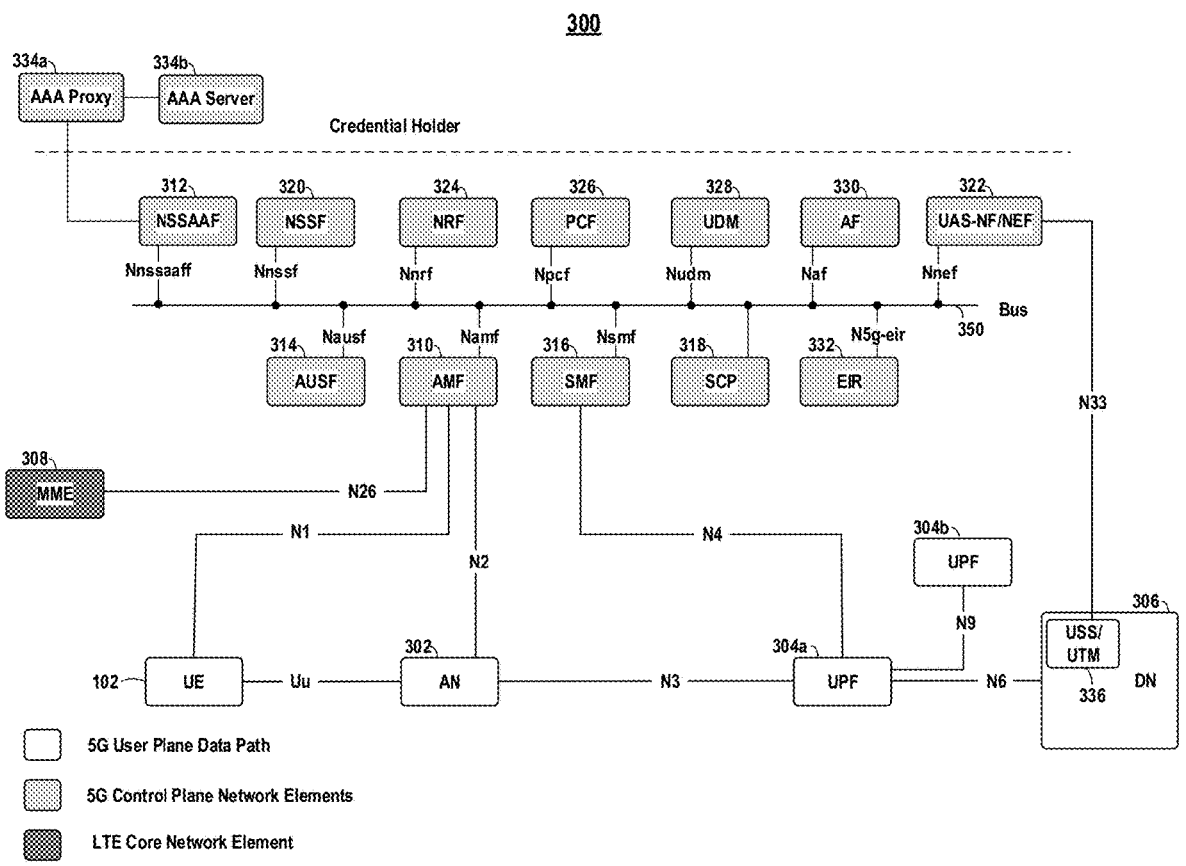
FIG. 3 illustrates an exemplary service-based wireless communication system architecture, according to some embodiments of the present disclosure.

FIG. 3 illustrates an exemplary service-based architecture 300 of a wireless communication system (referred to hereinafter as "system architecture 300), according to some embodiments of the present disclosure. System architecture 300 may include various network elements, such as 5G control plane (CP) network elements (also referred to herein as "network functions (NFs)) and LTE core network element(s) (e.g., MME 308), for example. System architecture 300 may also include access network 302 (e.g., including access node 104 of FIG. 1) and UE 102, among others.

System architecture 300 may be designed to support network function (NF) virtualization and software-defined networking. Moreover, system architecture 300 may leverage service-based interactions between different NFs. User plane (UP) functions may be separated from CP functions, as shown in FIG. 3. The separation of UP functions and CP functions in system architecture 300 may enable independent scalability, evolution, and flexible deployments in either a centralized or distributed manner. The UP data path of system architecture 300 may include, e.g., UE 102 (e.g., a UAV), access network 302 (e.g., access node 104), one or more user plane function(s) (UPF) 304a, 304b, and a data network (DN) 306. The CP data path includes various NFs. These NFs may include one or more of, e.g., AMF 310, NSSAAF 312, AUSF 314, SMF 316, service communication proxy (SCP) 318, network slice selection function (NSSF) 320, UAS-NF/network exposure function (NEF) 322, network repository function (NRF) 324, policy control function (PCF) 326, UDM 328, Application Function (AF) 330, Equipment Identity Register (EIR) 332, Authentication and Authorization (AAA) Proxy (AAA-P) 334a, and/or AAA Server (AAA-S) 334b. Each of the NFs may be coupled to a bus 350 via service-based interfaces (SIBs) labeled as, e.g., Namf, Nsmf, Nudm, etc. Where appropriate, system architecture 300 may include point-to-point connections labeled as, e.g., N1, N2, N3, etc. The responsibilities of each of the NFs are described below. A third-party entity, such as USS/unified threat management (UTM) 336, may be located in DN 306 and maintain subscription services. These subscription services may include uncrewed aerial services. USS/UTM 336 may include a USS network of one or more USS(s). Thus, as used herein, the term USS may refer to a USS network that includes one or more USS(s).

In addition to those responsibilities described above in connection with FIG. 1, AMF 310 may perform registration management, connection management, reachability management, MM, access authentication, and/or access authorization, just to name a few. NSSAAF 312 may support and initiate NSSAA operations with AAA-S 334b. If AAA-S 334b is associated with a third-party entity (e.g., Amazon), NSSAAF 312 may contact AAA-S 334b via AAA-P 334a. As mentioned above, AUSF 314 may perform user equipment authentication. SMF 316 may perform session establishment, session modification, session release, maintain a tunnel between UPF 304a and access node 104 of access network 302, user equipment IP address allocation and management, Dynamic Host Configuration Protocol (DHCP) functions (for both server and client), downlink data notification, and support for Proxy-Call Session Control Function (P-CSCF) discovery for IMS services, for example. SCP 318 may enable indirect communication between various NFs by routing information from an originating NF to a destination NF. NSSF 320 may support various functions associated with network slicing. For example, NSSF 320 may select the set of network slice instances (NSIs) to serve UE 102, determine the allowed NSSAI, map the allowed NSSAI to the subscribed S-NSSAI(s), determine the configured NSSAI, map the configured NSSAI to the subscribed S-NSSAI(s), determine the set of AMF(s) 310 to serve UE 102 or a list of candidate AMF(s) 310 (e.g., by querying NRF 324).

NRF 324 may enable NFs to disclose the service list offered by other NFs. PCF 326 may provide policy rules to certain NFs (e.g., AMF 310), and access subscription information relevant for policy decisions in a Unified Data Repository (UDR), for example. UDM 328 may perform subscription management, storage, and management of Subscription Permanent Identifier (SUPI) for each subscriber in the 5G system. AF 330 may provide application services to the subscribed user. For example, AF 330 may be associated with a video streaming service and/or uncrewed aerial services. If AF 330 is trusted, it may interact directly with other NFs. However, if AF 330 is a third-party entity, then it may interact with other NFs via UAS-NF/NEF 322.

Moreover, AMF 310 may be configured to coordinate various registration procedures so that UE 102 may access uncrewed aerial services at USS/UTM 336. These registration procedures may include, e.g., a primary authentication procedure, a network slice specific authentication and authorization (NSSAA) procedure, and the UUAA-MM procedure depicted in FIGS. 7A and 7B. In some embodiments, AMF 310 may coordinate the registration procedures by initiating each procedure at a certain time or in a certain order. For instance, AMF 310 may initiate the primary authentication procedure when a registration request is received from UE 102. The primary authorization procedure may be performed by, e.g., UE 102, access network 302, one or more AMF(s) 310, AUSF 314, SMF 316, PCF 326, and/or UDM 328. Moreover, AMF 310 may initiate/perform operations associated with a UUAA procedure for a UAS reauthentication/reauthorization with USS/UTM 336.

UAS-NF/NEF 322 may support the exposure of network functions capabilities of NFs to external NFs such as third-party entities, e.g., USS/UTM 336. External exposure may include monitoring capability, provisioning capability, policy/charging capability, and analytics reporting capability. The monitoring capability may include the monitoring of certain events for UE 102 and making such monitoring event information available for external exposure via UAS-NF/NEF 322. The provisioning capability may include allowing an external party to provide information that can be used by UE 102. The policy/charging capability may include handling QoS and charging policy for UE 102 based on the request from an external party.

Moreover, UAS-NF/NEF 322 may initiate/coordinate operations associated with the exemplary UAS reauthentication/reauthorization procedure based on a request received from USS/UTM 336. The request may be received at or near the expiry of a flight session or when service requirement changes occur, for example. Upon receiving the UAS reauthentication/reauthorization request, UAS-NF/NEF 322 may access UE UUAA context information to determine the type of UUAA NAS termination point (e.g., AMF 310 or SMF 316) that performed the initial UUAA procedure. UAS-NF/NEF 322 may send a request to UDM 328 for the ID of the UUAA NAS termination point (referred to herein after as serving NF element") currently serving or associated with UE 102. This request may include an indication of the type of serving NF element identified from the UE UUAA context information. The type of serving NF element may be indicated because a service area may be associated with both an AMF and SMF, for example. Upon receiving the request, UDM 328 may identify the serving NF element based on, e.g., a look-up table that correlates UEs and serving UUAA NAS termination points. The look-up table may be maintained by or otherwise accessible to UDM 328. UDM 328 may respond to UAS-NF/NEF 322 with a message that includes the serving NF element ID. Once the serving NF element ID is received, UAS-NF/NEF 322 may send a UAS reauthentication/reauthorization notification to the serving NF element. The UAS reauthentication/reauthorization notification may instruct the serving NF element to perform a second UUAA procedure to reauthenticate/reauthorize the UE 102 with USS/UTM 336. The second UUAA procedure may be performed so that the UE's 102 active registration with USS/UTM 336 does not expire, and hence, so that disruption to an active flight session is avoided. In response to the UAS reauthentication/reauthorization notification, the serving NF element may respond to the UAS-NF/NEF 322 with a UAS reauthentication/reauthorization acknowledgment. The serving NF element (e.g., AMF 310 or SMF 316)

may initiate and/or perform the second UUAA procedure to reauthenticate/reauthorize UE 102 with the USS/UTM 336. When UE 102 is in an idle mode/state, the serving NF element may initiate a network-triggered service request to establish a signaling communication path with UE 102 before initiating the second UUAA procedure.

Thus, the exemplary UAS reauthentication/reauthorization technique provides a mechanism by which UE 102 may be reauthenticated/reauthorized at or near the expiry of the flight session, or when service requirement changes occur, in a way that preserves the security protocols of USS/UTM 336, while at the same time avoiding disruption to UE's 102 uncrewed aerial services.

Figure 4:
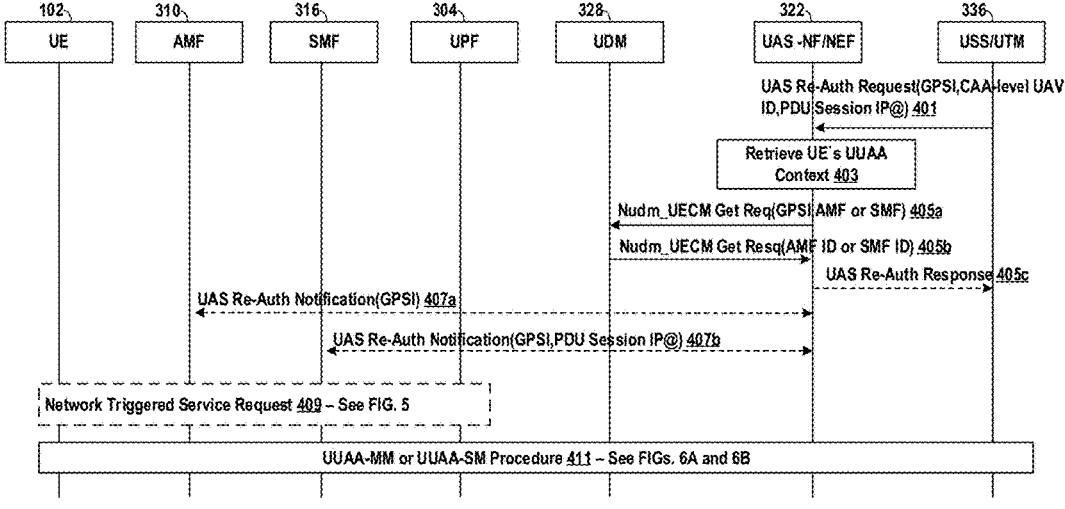
FIG. 4 illustrates a conceptual flow diagram of a first exemplary data flow of an exemplary UAS reauthentication/reauthorization procedure, according to some embodiments of the present disclosure.
Figure 5:
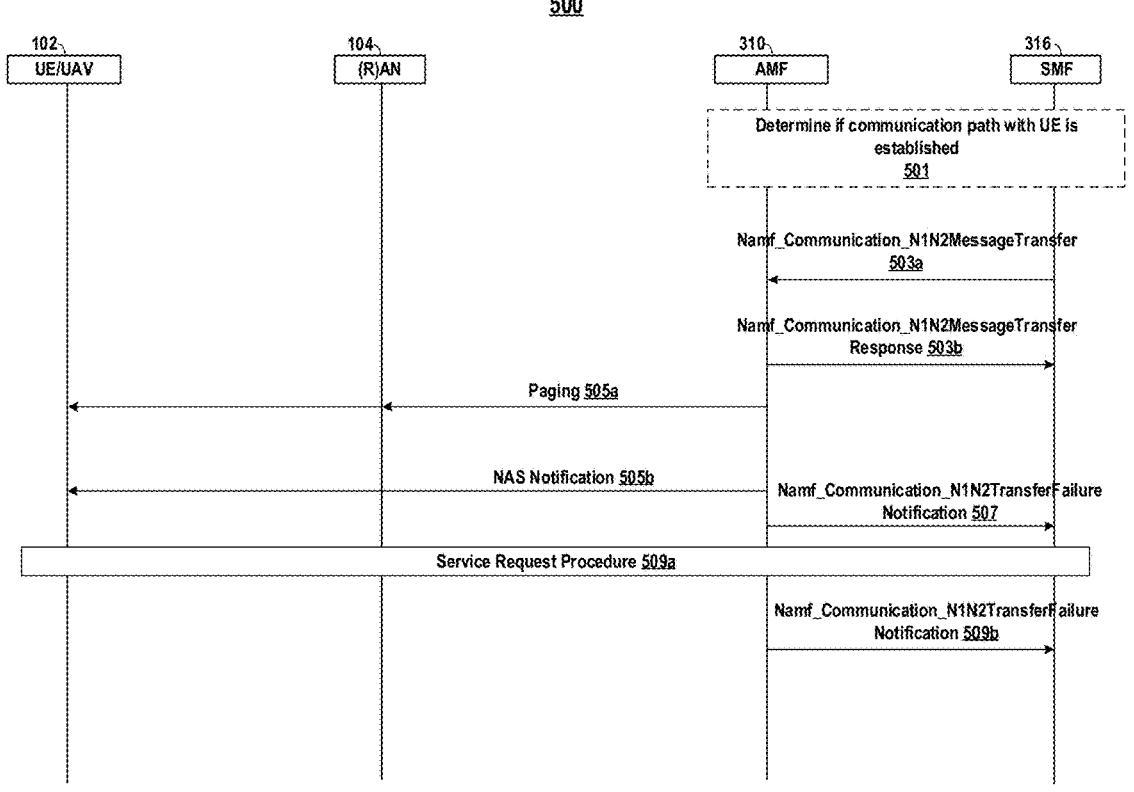
FIG. 5 illustrates a conceptual flow diagram of a network-triggered service request implemented as part of the exemplary UAS reauthentication/reauthorization procedure of FIG. 4, according to some embodiments of the present disclosure.
Figure 6A:
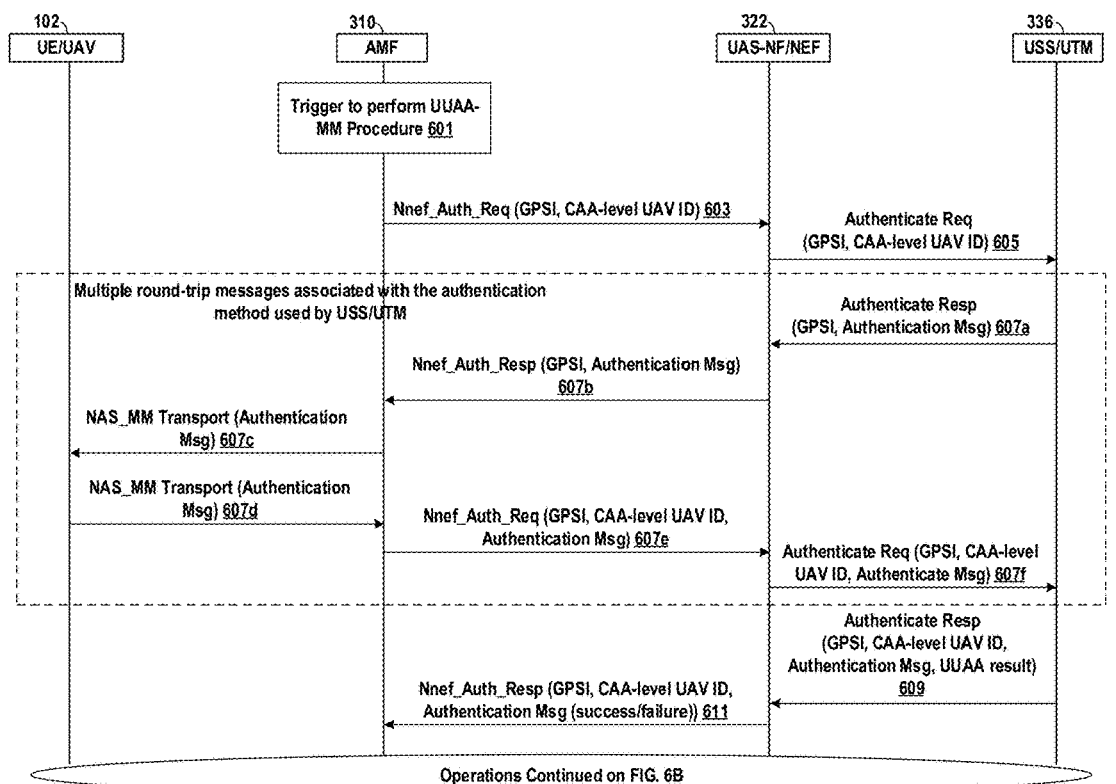
FIGS. 6A and 6B illustrate a conceptual flow diagram of a UUAA procedure implemented as part of the exemplary UAS reauthentication/reauthorization procedure of FIG. 4, according to some embodiments of the present disclosure.
Figure 6B:
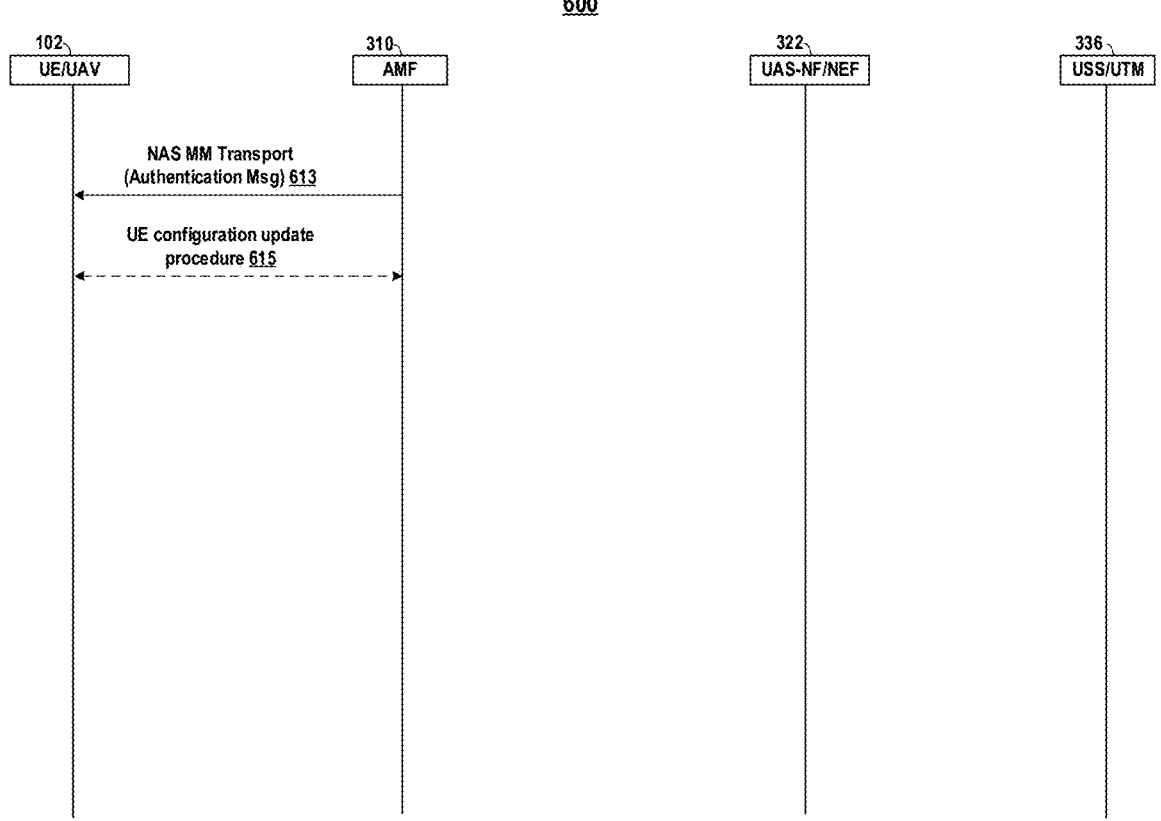

FIG. 4 illustrates a conceptual flow diagram of a first exemplary data flow 400 of the exemplary UAS reauthentication/reauthorization procedure performed between UE 102 (e.g., a UAV) and a set of network elements, according to some embodiments of the present disclosure. FIG. 5 illustrates a conceptual flow diagram of a network triggered service request 500 implemented as part of the exemplary UAS reauthentication/reauthorization procedure of FIG. 4, according to some embodiments of the present disclosure. FIGS. 6A and 6B illustrate a conceptual flow diagram of an example UUAA-MM procedure 600 that may be implemented as part of the exemplary UAS reauthentication/reauthorization procedure of FIG. 4, according to some embodiments of the present disclosure. FIGS. 4, 5, 6A, and 6B will be described together.

Referring to FIG. 4, the exemplary UAS reauthentication/reauthorization procedure may be triggered by USS/UTM 336 after UE 102 has been authenticated/authorized by a UUAA procedure, e.g., such as the UUAA-MM procedure depicted in FIGS. 6A and 6B, or alternatively, by a UUAA-SM procedure (not shown). Here, UE 102 may be configured as a UAV, and the user of the UAV may subscribe to the uncrewed aerial services maintained at USS/UTM 336, for example.

When the initial UUAA procedure is implemented during a primary authentication procedure for UE's 102 registration with the access network, the UUAA-MM procedure may be used. The UUAA-MM procedure may be initiated/coordinated by AMF 310 (e.g., serving NF element), for example. On the other hand, when the initial UUAA procedure is implemented during PDU session establishment, the UUAA-SM procedure may be used. The UUAA-SM procedure may be initiated/coordinated by SMF 316 (e.g., serving NF element), for example. In either case, USS/UTM 336 may request that UE 102 be reauthenticated/reauthorized. For example, once authenticated/authorized, UE 102 may be granted access to uncrewed aerial services for a certain duration. This duration may be fixed or variable time intervals as configured by the service provider. Prior to the end of the initial duration, USS/UTM 336 may request the reauthentication/reauthorization of UE 102 to maintain security measures as set forth by the service provider. Additionally and/or alternatively, USS/UTM 336 may request UAS reauthentication/reauthorization of UE 102 if a change to subscription services occurs during an ongoing flight session. However, USS/UTM 336 may request UAS reauthentication/reauthorization of UE 102 at any time for any reason without departing from the scope of the present disclosure. However, USS/UTM 336 may request UAS reauthentication/reauthorization for UE 102 at any time for any reason without departing from the scope of the present disclosure.

To initiate a UAS reauthentication/reauthorization procedure for UE 102, USS/UTM 336 may send (at 401) a UAS reauthentication/reauthorization request to UAS-NF/NEF 322, which coordinates the operations associated therewith. The UAS reauthentication/reauthorization request may include information that identifies the UE for which UAS reauthentication/reauthorization is requested. For example, the UAS reauthentication/reauthorization request may include one or more of a generic public subscription identifier (GPSI) associated with UE 102, the civil aviation association (CAA)-level UAV ID assigned to UE 102 by USS/UTM 336, PDU session information associated with UE 102, just to name a few.

Upon receipt of the UAS reauthentication/reauthorization request, UAS-NF/NEF 322 may retrieve (at 403) UUAA context information associated with the initial UUAA procedure. The UUAA context information may indicate, e.g., whether the initial UUAA procedure was initiated/coordinated by AMF 310 (e.g., a UUAA-MM procedure) or SMF 316 (e.g., a UUAA-SM procedure). For example, the UUAA context information may indicate the NF element type (e.g., AMF 310 or SMF 316) used to perform the initial UUAA procedure, the type of UUAA procedure (e.g., UUAA-MM procedure or UUAA-SM procedure), or both. The same NF element type as that used in the initial UUAA procedure will be notified to initiate/coordinate the subsequent UUAA procedure for UE 102. In some embodiments, the UUAA context information may be maintained locally at UAS-NF/NEF 322. In some embodiments, the UUAA context information may be maintained by an Unstructured Data Storage Function (UDSF). When maintained by the UDSF, UAS-NF/NEF 322 may retrieve the UUAA context information using a Nudsf_UnstructuredDataManagement_Query service operation, for example.

Once the NF element type is identified, UAS-NF/NEF 322 may query UDM 328 for the ID of the NF element currently serving UE 102. The serving NF element may be AMF 310 or SMF 316 depending on the type of initial UUAA procedure, as mentioned above. Moreover, the serving NF element may be different than the one that initiated/coordinated the initial UUAA procedure. This may occur when UE 102 moves or flies into a service region associated with a different NF element and/or due to handoff caused by a change in channel conditions, among others. UDM 328 maintains an updated list of serving NF element IDs. Thus, UAS-NF/NEF 322 may query UDM 328 for this information by sending (at 405a) a Nudm_UECM Get request, which indicates the type of NF element identified from the UUAA context information. Moreover, the Nudm_UECM Get request may include a UE identifier, e.g., such as the GPSI, CAA-level UAV ID, etc. Based on the information included in the Nudm_UECM Get request, UDM 328 may identify the ID of the AMF 310 or SMF 316 in the service region in which UE 102 is presently located. This information may be included in, e.g., a look-up table maintained by UDM 328. UDM 328 may send (at 405b) a Nudm_UECM Get response, which indicates the serving NF element ID. However, if UDM 328 is unable to identify the serving NF element ID, the Nudm_UECM Get response may include a failure response. In either case, UAS-NF/NEF 322 may send (at 405c) a UAS reauthentication/reauthorization response to USS/UTM 336. The UAS reauthentication/reauthorization response may indicate either success (e.g., when a serving NF element ID is received from UDM 328) or failure (e.g., when a serving NF element ID is not received from UDM 328).

When the serving NF element ID indicates AMF 310, UAS-NF/NEF 322 may send (at 407a) a UAS reauthentication/reauthorization notification to AMF 310. The UAS reauthentication/reauthorization notification may instruct AMF 310 to perform a subsequent UUAA procedure for the UE 102 whose UE identifier (e.g., GPSI, CAA-level UAV ID, etc.) is included in the notification. Here, AMF 310 may respond (at 407a) with a UAS reauthentication/reauthorization acknowledgment, which indicates to UAS-NF/NEF 322 that the notification was received. On the other hand, when serving NF element ID indicates SMF 316, UAS-NF/NEF 322 may send (at 407b) a UAS reauthentication/reauthorization notification to SMF 316. The UAS reauthentication/reauthorization notification may instruct SMF 316 to perform a subsequent UUAA procedure for the UE 102 whose UE identifier (e.g., GPSI, CAA-level UAV ID, etc.) is included in the notification. Here, SMF 316 may respond (at 407b) with a UAS reauthentication/reauthorization acknowledgment, which indicates to UAS-NF/NEF 322 that the notification was received.

Prior to initiating (at 411) the second UUAA procedure, the serving NF element (e.g., AMF 310 or SMF 316) may determine whether UE 102 has an established communication link with the access network. Namely, serving NF element may determine whether UE 102 is in a low-power or an idle state. When UE 102 has an established communication link with the access network, the serving NF element may initiate (at 411) the second UUAA procedure (e.g., UUAA-MM or UUAA-SM). However, when UE 102 is in a low-power or idle state, the serving NF element (e.g., AMF 310 or SMF 316) may initiate (at 409) a network triggered service request, additional details of which are provided below in connection with FIG. 5.

For example, referring to FIG. 5, when SMF 316 is the serving NF element, operations 501, 503a, 503b, 505a, 505b, 507, 509a, and 509b are performed. However, when AMF 310 is the serving NF element, operations 501, 505a, 505b, 507, 509a, and 509b are performed. In other words, when AMF 310 is the serving NF element, operations 503a and 503b may be omitted. In either case, the serving NF element (e.g., AMF 310 or SMF 316) may determine (at 501) if a communication path between UE 102 and access network 104 is established. When SMF 316 determines that a communication path between UE 102 and access network 104 is not established, SMF 316 may send (at 503a) a Namf_Communication_N1N2MessageTransfer signal to AMF 310. If UE 102 is in connected mode idle state (CM-IDLE state), and AMF 310 is able to page UE 102, AMF 310 may send (at 503b) a Namf_Communiction_N1N2MewssageTransfer response to SMF 316. The Namf_Communiction_N1N2MewssageTransfer response may indicate to SMF 316 that AMF 310 is attempting to reach UE 102.

Still referring to FIG. 5, if UE 102 is in CM-IDLE state and is reachable, AMF 310 may send (at 505a) a paging message to UE 102 via access network 104 (e.g., access node, gNB, etc.). For example, the paging message may include information, e.g., such as a NAS ID for paging, a registration area list, paging discontinuous reception (DRX) length, paging priority, etc. via an access node of access network 104 belonging to the registration area(s) in which UE 102 is registered. Then, access network 104 may forward the paging message to UE 102. In some embodiments, if UE 102 is simultaneously registered over 3GPP and non-3GPP accesses in the same public land mobile network (PLMN), and UE 102 is in CM-CONNECTED state for non-3GPP access and in CM-IDLE for 3GPP access, and based on local policy, AMF 310 may send (at 505c) a NAS Notification message containing the 3GPP Access Type to UE 102 over non-3GPP access and set a notification timer.

AMF 310 may monitor the paging procedure with a timer. If no response is received within the timer, AMF 310 may apply further paging according to any applicable paging strategy. If UE 102 does not respond to the paging message within the timer, AMF 310 may send (at 507) a Namf_Communication_N1N2TransferFailure Notification to SMF 316. If UE 102 is in CM-IDLE state when the paging message is received, UE 102 shall initiate (at 509*a*) a service request procedure to establish the communication path (e.g., user plane connection path) with access network 104 and/or AMF 310.

If UE 102 is unable to establish the communication path, a reject paging indication (not shown) may be sent to AMF 310. When received, AMF 310 may send (at 509*b*) a Namf_Communication_N1N2MessageTransferFailure notification to SMF 316. The Namf_Communication_N1N2MessageTransferFailure notification may indicate that no communication path can be established at this time. Here, SMF 316 may send an indication of the failure to UAS-NF/NEF 322.

Referring again to FIG. 4, once a communication link between UE 102 and the access network is established via the network triggered service request described above in connection with FIG. 5 or via any other mechanism, the serving NF element (e.g., AMF 310 or SMF 316) may initiate (at 411) a second UUAA procedure (e.g., either UUAA-MM or UUAA-SM) to register or maintain UE's 102 existing registration with USS/UTM 336. When the second UUAA procedure includes a UUAA-MM procedure, the second operations may be performed by UE 102, AMF 310, UAS-NF/NEF 322, and USS/UTM 336, additional details of which are provided below in connection with FIGS. 6A and 6B. On the other hand, when the second UUAA procedure includes a UUAA-SM procedure, the second operations may be performed by UE 102, SMF 316, UAS-NF/NEF 322, and USS/UTM 336, for example. For ease of description, the detailed operations for the UUAA-SM procedure are not included herein, but would be understood by one of ordinary skill.

Referring to FIGS. 6A and 6B, UUAA-MM procedure 600 may correspond to the UUAA-MM procedure shown (at 411) in FIG. 4, for example. UUAA-MM procedure 600 may register UE 102 (e.g., UAV) with USS/UTM 336. UUAA-MM procedure 600 may be implemented by, e.g., UE 102, AMF 310, UAS-NF/NEF 322, and/or USS/UTM 336.

Referring to FIG. 6A, in response to UE's 102 successful registration with a network slice, AMF 310 may trigger (at 601) the initiation of UUAA-MM procedure 600. Then, AMF 310 may select UAS-NF/NEF 322 based on, e.g., local operator configuration or based on a UE-provided identity, such as a USS address. Once UAS-NF/NEF 322 is selected, AMF 310 may send (at 603) a Nnef_Authentication_Request that requests the authentication of UE 102 by USS/UTM 336. The Nnef_Authentication_Request may include information associated with UE 102, e.g., such as the GPSI and/or CAA-level UAV ID provided by UE 102 in an initial registration request, or otherwise obtained during the primary authentication procedure with the access network. Optionally, the USS address of USS/UTM 336 and/or UE location information (e.g., cell ID) may be included in the Nnef_Authentication_Request.

Still referring to FIG. 6A, UAS-NF/NEF 322 may determine the USS for which the UUAA-MM procedure is performed based on information included in the Nnef_Authentication_Request. For example, UAS-NF/NEF 322 may identify the appropriate USS based on the USS address (if included in the Nnef_Authentication_Request) and/or based on the CAA-level UAV ID, which is assigned to UE 102 by USS/UTM 336. Once identified, UAS-NF/NEF 322 may send a Naf_Authentication_Request to USS/UTM 336. The Naf_Authentication_Request may include information, e.g., such as the GPSI, the CAA-level UAV ID, and/or the cell ID of UE 102.

Depending on the authentication method used by USS/UTM 336, multiple round-trip messages may be sent between USS/UTM 336 and UE 102 (via UAS-NF/NEF 322 and AMF 310). In the present disclosure, six authentication messages are exchanged (at 607*a*-607*f*). However, more or fewer messages may be exchanged, depending on the authentication method used by USS/UTM 336.

Referring to FIG. 6A, USS/UTM 336 may send (at 607*a*) an authentication response that includes, e.g., the GPSI. The authentication response sent by USS/UTM 336 may also include an authentication message (e.g., an N33 message) that indicates the authentication method used by USS/UTM 336, and which may be forwarded to UE 102 via NAS_MM transport messages. In some embodiments, the authentication message may include a callback uniform resource identifier (URI), which may be used for a subsequent authenticate request sent (at 607*f*) by UAS-NF/NEF 322. Once received, UAS-NF/NEF 322 may forward (at 607*b*) a Nnef_Autheticate_Response, which includes the GPSI and authentication message, to AMF 310. AMF 310 may forward (at 607*c*) the authentication message to UE 102 as a NAS_MM transport message. UE 102 may respond (at 607*d*) with a NAS_MM transport message that includes information, e.g., the GPSI, CAA-level UAV ID, and a UUAA aviation payload (if not provided by UE 102 in the initial primary authentication request). AMF 310 may send (at 607*e*) a Nnef_Auth_Request, which includes the GPSI, CAA-level UAV ID, authentication message, and/or UUAA aviation payload, to UAS-NF/NEF 322. UAS-NF/NEF 322 may send (at 607*f*) the authenticate request to USS/UTM 336. These multiple round-trip messages may indicate to UE 102 and AMF 310 that a UUAA-MM result is pending, and UE 102 is authenticated.

Once the authenticate request is received (at 607*f*), USS/UTM 336 may determine whether UE 102 can be authorized by comparing UE identity information with subscription information maintained by USS/UTM 336. For example, USS/UTM 336 may maintain a look-up table that correlates UE identity information (e.g., GPSI, CAA-level UAV ID, and/or cell ID) with subscription information. The subscription information may indicate whether a UE's subscription is valid or invalid, in some embodiments. A valid subscription may indicate that UE 102 can be authenticated for access to uncrewed aerial services. Otherwise, an invalid subscription may indicate that UE 102 cannot be authorized for access to uncrewed aerial services. By way of example, UE 102 may pay a monthly fee to subscribe to uncrewed aerial services maintained by USS/UTM 336. When a payment for the subscription is received, the look-up table may indicate that the subscription associated with a particular UE (e.g., GPSI, CAA-level UAV ID, and/or cell ID) is valid. When UE 102 has a valid subscription, USS/UTM 336 may allow UE 102 to be registered with USS/UTM 336, and access to the uncrewed aerial services may be granted. Otherwise, when the subscription goes unpaid or expires, the look-up table may indicate that the subscription for that UE is invalid, and hence, UE 102 may not register with USS/UTM 336 during the UUAA-MM procedure.

Once the UUAA-MM result is determined (e.g., success or failure), USS/UTM 336 may send (at 609) an authenticate response, which includes GPSI, CAA-level UAV ID, authentication message, and/or UUAA-MM result (e.g., success or failure), to UAS-NF/NEF 322. USS/UTM 336 may include a UUAA authorization payload associated with UE 102. The UUAA authorization payload may include security information that secures communications between UE 102 and USS/UTM 336. UAS-NF/NEF 322 may send (at 611) the authenticate response as a Nnef_Auth_Response to AMF 310. The Nnef_Auth_Response may indicate a success or failure of the UUAA-MM procedure to AMF 310 and may include one or more of the information included in the authenticate message by USS/UTM 336. AMF 310 may determine whether the UUAA-MM procedure succeeded or failed based on the Nnef_Auth_Response.

Referring to FIG. 6B, AMF 310 may send (at 613) the authentication message (e.g., indicating UUAA-MM success/failure) to UE 102. If UUAA-MM succeeded, AMF 310 may trigger (at 615) a user equipment configuration update procedure to deliver to UE 102 the UAV authorization information from USS/UTM 336. UE 102 may access the uncrewed aerial services by including the UAV authorization information in messages sent to USS/UTM 336 (e.g., via AMF 310).

Thus, the exemplary UAS reauthentication/reauthorization procedure described above in connection with FIGS. 4, 5, 6A, and 6B may enable the enforcement of USS/UTM 336 security protocols as set by the service provider without disrupting an ongoing flight session of UE 102.

Figure 7:
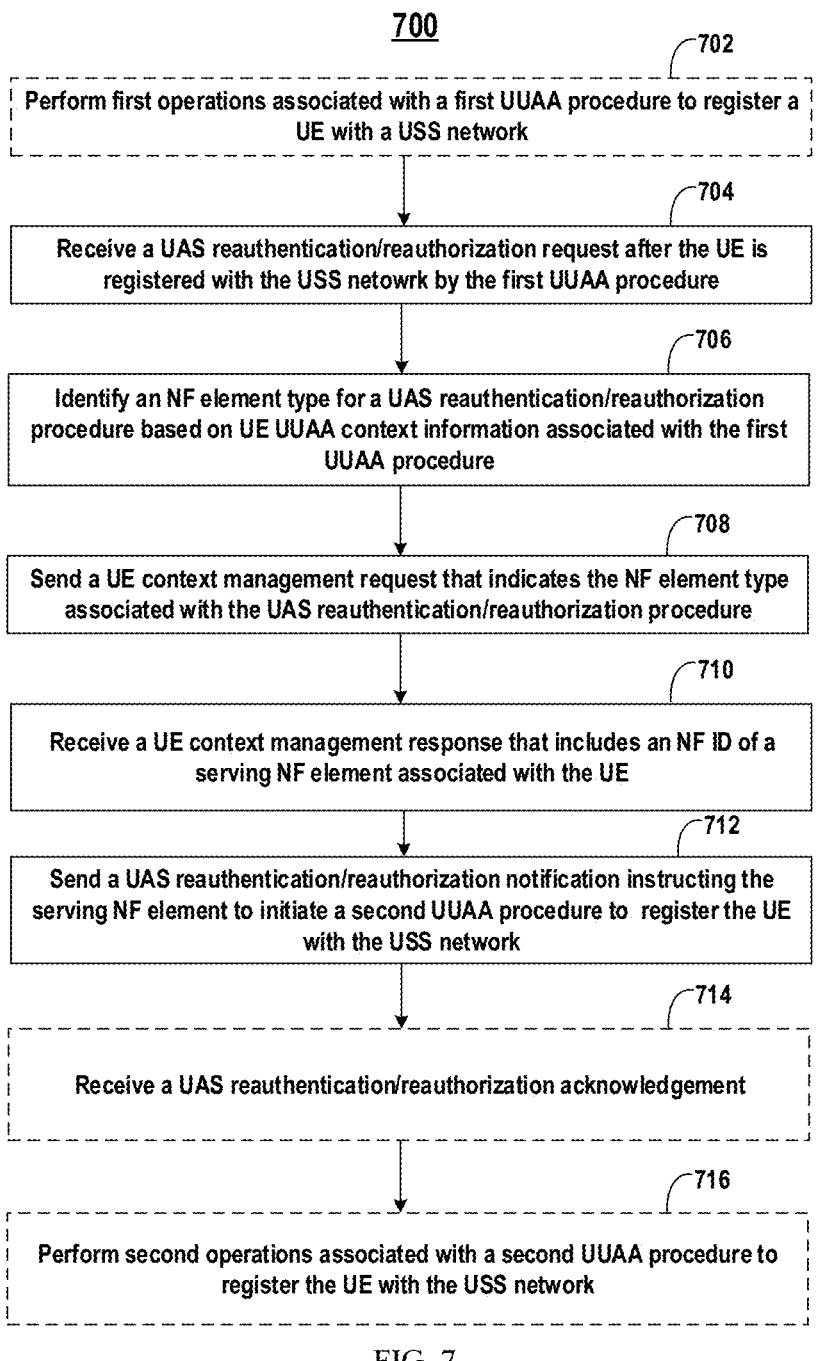
FIG. 7 illustrates a flow chart of a first exemplary method of wireless communication, according to some embodiments of the present disclosure.

FIG. 7 illustrates a flowchart of an exemplary method 700 of wireless communication, according to embodiments of the disclosure. Exemplary method 700 may be performed by an apparatus for wireless communication, e.g., such as core network element 106, node 200, UAS-NF/NEF 322, apparatus 802/802', network element 1150, or any other core network element or group of core network elements described herein. Method 700 may include steps 702-716 as described below. It is to be appreciated that some of the steps may be optional (e.g., which may be indicated by dashed lines), and some of the steps may be performed simultaneously, or in a different order than shown in FIG. 7.

Referring to FIG. 7, at 702, the apparatus may perform first operations associated with a first UUAA procedure to register a UE with a USS network. For example, referring to FIG. 4, UAS-NF/NEF 322 may perform operations associated with a UUAA-MM procedure or a UUAA-SM procedure to initially register UE 102 with USS/UTM 336. The UUAA-MM procedure may be performed when UE 102 registers with USS/UTM 336 during primary authentication with the access network. The UUAA-SM procedure may be performed when UE 102 registers with USS/UTM 336 during PDU session establishment. As mentioned above, the USS network may include one or more USS(s). Thus, UE 102 may initially register with the USS/UTM 336 associated with its initial serving area.

At 704, the apparatus may receive a UAS reauthentication/reauthorization request after the UE is registered with the USS network by the first UUAA procedure. For example, referring to FIG. 4, to initiate a UAS reauthentication/reauthorization procedure for UE 102, USS/UTM 336 may send (at 401) a UAS reauthentication/reauthorization request to UAS-NF/NEF 322. The UAS reauthentication/reauthorization request may include information that identifies the UE for which UAS reauthentication/reauthorization is requested. UE 102 may receive the UAS reauthentication/reauthorization request from the same USS with which it initially registered. However, if UE 102 has moved into a different service area associated with a different USS of the USS network, UE 102 may receive the UAS reauthentication/reauthorization request from a different USS than the one used for initial registration. For example, the UAS reauthentication/reauthorization request may include one or more of a GPSI associated with UE 102, the CAA-level UAV ID assigned to UE 102 by USS/UTM 336, PDU session information associated with UE 102, just to name a few. In some embodiments, the UAS-NF/NEF 322 that receives the UAS reauthentication/reauthorization request (at 704) may be the same or different than the UAS-NF/NEF 322 that performs the first operations associated with the first UUAA procedure (at 702) to register UE 102 with a USS network (e.g., USS/UTM 336).

At 706, the apparatus may, in response to receiving the UAS reauthentication/reauthorization request, identify an NF element type for a UAS reauthentication/reauthorization procedure based on UE UUAA context information associated with the first UUAA procedure. For example, referring to FIG. 4, upon receipt of the UAS reauthentication/reauthorization request, UAS-NF/NEF 322 may retrieve (at 403) UUAA context information associated with the initial UUAA procedure that registered UE 102 with USS/UTM 336. The UUAA context information may indicate, e.g., whether the initial UUAA procedure was initiated/coordinated by AMF 310 (e.g., a UUAA-MM procedure) or SMF 316 (e.g., a UUAA-SM procedure). For example, the UUAA context information may indicate the NF element type (e.g., AMF 310 or SMF 316) used to perform the initial UUAA procedure, the type of UUAA procedure (e.g., UUAA-MM procedure or UUAA-SM procedure), or both. The same NF element type as that used in the initial UUAA procedure will be notified to initiation/coordinate the subsequent UUAA procedure to register or maintain UE's 102 registration with USS/UTM 336 (e.g., a USS network). In some embodiments, the UUAA context information may be maintained locally at UAS-NF/NEF 322. In some embodiments, the UUAA context information may be maintained by an Unstructured Data Storage Function (UDSF). When maintained by the UDSF, UAS-NF/NEF 322 may retrieve the UUAA context information using Nudsf_UnstructuredData-Management_Query service operation, for example.

At 708, the apparatus may send a UE context management request that indicates the NF element type associated with the UAS reauthentication/reauthorization procedure. For example, referring to FIG. 4, once the NF element type is identified, UAS-NF/NEF 322 may query UDM 328 for the ID of the NF element currently serving UE 102. The serving NF element may be AMF 310 or SMF 316 depending on the type of initial UUAA procedure, as mentioned above. Moreover, the serving NF element may be different than the one that initiated/coordinated the initial UUAA procedure. This may occur when UE 102 moves or flies into a service region associated with a different NF element and/or due to handoff caused by a change in channel conditions, for example. UDM 328 maintains an updated list of serving NF element IDs. Thus, UAS-NF/NEF 322 may query UDM 328 for this information by sending (at 405a) a Nudm_UECM Get request, which indicates the type of NF element identified from the UUAA context information and a UE identifier, such as the GPSI, CAA-level UAV ID, etc. Based on the information included in the Nudm_UECM Get request, UDM 328 may identify the ID of the AMF 310 or SMF 316 in the service region in which UE 102 is presently located. This information may be included in, e.g., a look-up table maintained by UDM 328.

At 710, the apparatus may receive a UE context management response that includes an NF ID of a serving NF element associated with the UE. The serving NF element may be of the NF element type. For example, referring to FIG. 4, based on the information included in the Nudm_ UECM Get request, UDM 328 may identify the ID of the AMF 310 or SMF 316 in the service region in which UE 102 is presently located. This information may be included in, e.g., a look-up table maintained by UDM 328. UDM 328 may send (at 405*b*) a Nudm_UECM Get response, which indicates the serving NF element ID.

At 712, the apparatus may send a UAS reauthentication/reauthorization notification instructing the serving NF element to initiate a second UUAA procedure to register the UE with the USS network. For example, referring to FIG. 4, when the serving NF element ID indicates AMF 310, UAS-NF/NEF 322 may send (at 407*a*) a UAS reauthentication/reauthorization notification to AMF 310. The UAS reauthentication/reauthorization notification may instruct AMF 310 to perform a subsequent UUAA procedure for the UE 102 whose UE identifier (e.g., GPSI, CAA-level UAV ID, etc.) is included in the notification. On the other hand, when serving NF element ID indicates SMF 316, UAS-NF/NEF 322 may send (at 407*b*) a UAS reauthentication/reauthorization notification to SMF 316. The UAS reauthentication/reauthorization notification may instruct SMF 316 to perform a subsequent UUAA procedure for the UE 102 whose UE identifier (e.g., GPSI, CAA-level UAV ID, etc.) is included in the notification.

At 714, the apparatus may, in response to the serving NF element receiving the UAS reauthentication/reauthorization notification, receive, from the serving NF, a UAS reauthentication/reauthorization acknowledgment. For example, referring to FIG. 4, when the serving NF element includes AMF 310, AMF 310 may respond (at 407*a*) with a UAS reauthentication/reauthorization acknowledgment, which indicates to UAS-NF/NEF 322 that the notification was received. On the other hand, when the serving NF element includes SMF 316, SMF 316 may respond (at 407*b*) with a UAS reauthentication/reauthorization acknowledgment, which indicates to UAS-NF/NEF 322 that the notification was received.

At 716, the apparatus may perform second operations associated with a second UUAA procedure to register the UE with the USS network. For example, referring to FIG. 4, UAS-NF/NEF 322 may perform operations associated with a UUAA-MM procedure or a UUAA-SM procedure to initially register UE 102 with USS/UTM 336. The UUAA-MM procedure may be performed when UE 102 registers with USS/UTM 336 during primary authentication with the access network. The UUAA-SM procedure may be performed when UE 102 registers with USS/UTM 336 during PDU session establishment. While in flight, UE 102 may enter a new service area associated with a different USS than that which was used for initial registration via the first UUAA procedure. Thus, the second UUAA procedure may register UE 102 with a new serving USS, in some instances. The USS(s) of the USS network may be in communication with one another, and the new serving USS may have or access the CAA-level UAV ID assigned to UE 102 by a different USS that performed initial registration of UE 102 via the first UUAA procedure. However, in some other instances, e.g., such as when UE 102 remains in the same serving area, UE 102 may perform the second operations associated with the second UUAA procedure to maintain its registration with the same USS. In some embodiments, the UAS-NF/NEF 322 that performs the second operations (at

716) associated with the second UUAA procedure be the same or different than the UAS-NF/NEF 322 that receives the UAS reauthentication/reauthorization request (at 704) and/or that performs the first operations (at 702) associated with the first UUAA procedure (at 702) to register UE 102 with a USS network (e.g., USS/UTM 336). The UAS-NF/NEF 322 may be different when UE 102 is in flight and moves into a new coverage or service area, for instance.

Figure 8:
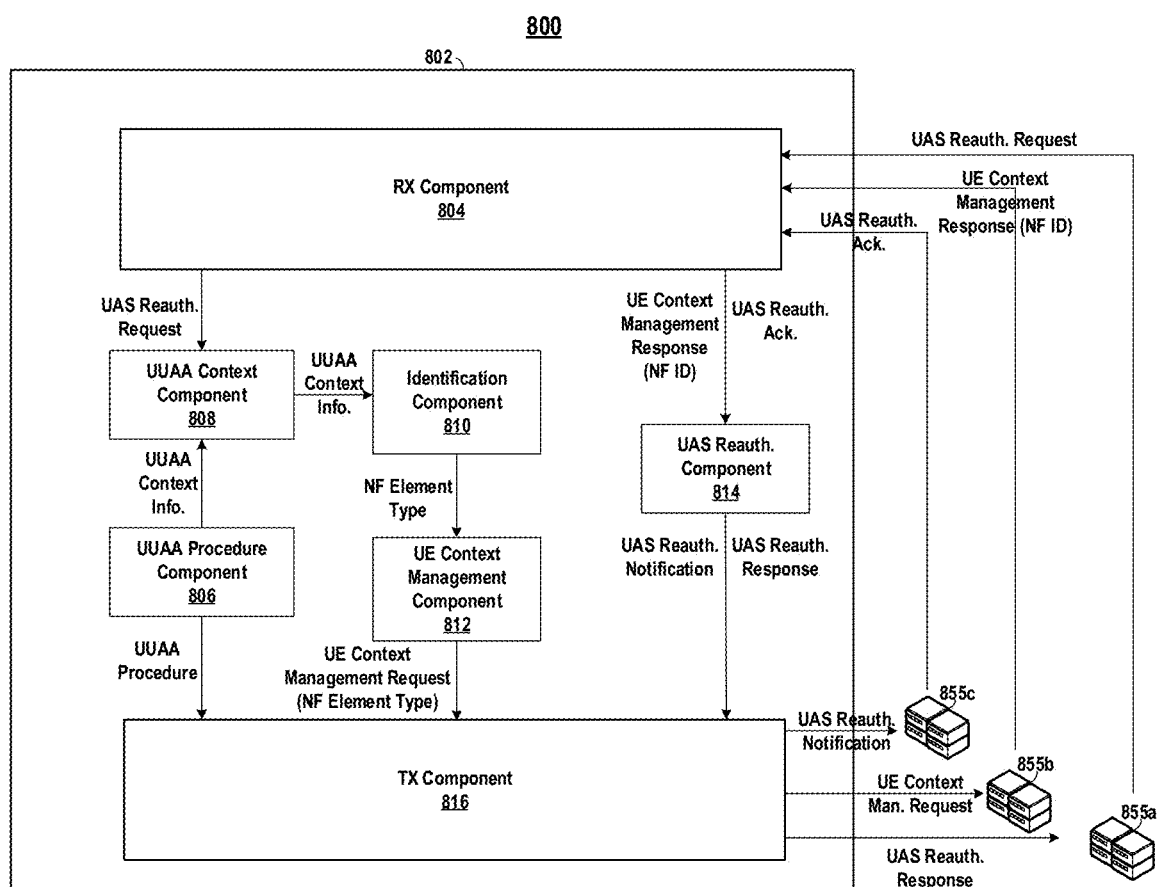
FIG. 8 illustrates a conceptual data flow diagram depicting the data flow between different components in a first exemplary apparatus, according to some embodiments of the present disclosure.

FIG. 8 is a conceptual data flow diagram 800 illustrating the data flow between different means/components in an exemplary apparatus 802. Apparatus 802 may be a network element, e.g., such as core network element 106, node 200, UAS-NF/NEF 322, apparatus 802', and/or first network element 1150. Apparatus 802 may be in communication with a first network element 855*a* (e.g., USS/UTM 336), a second network element 855*b* (e.g., UDM 328), and a third network element 355*c* (e.g., serving NF element, AMF 310, or SMF 316), among others. Apparatus 802 may include a receiver (RX) component 804, a UUAA procedure component 806, a UUAA context component 808, an identification component 810, a UE context management component 812, a UAS reauthentication/reauthorization component 814, and a transmitter (TX) component 816.

UUAA procedure component 806 may be configured to perform one or more first operations associated with a first UUAA procedure (e.g., UUAA-MM or UUAA-SM) to initially register a UE (not shown) with first network element 855*a*. Once registered, the UE may access uncrewed aerial services maintained by first network element 855*a*. Using the uncrewed aerial services, the UE may perform a flight session for a certain period of time. UUAA procedure component 806 may send UUAA context information associated with the first UUAA procedure to UUAA context component 808, which maintains the UUAA context information. The UUAA context information may indicate whether the first UUAA procedure was a UUAA-MM procedure or a UUAA-SM procedure, for example.

Prior to expiry of the flight session, or when there is a change in subscription services, first network element 855*a* may be configured to send a UAS reauthentication/reauthorization request that is received by RX component 804. The UAS reauthentication/reauthorization request may be associated with a second UUAA procedure to register or maintain the UE's registration with first network element 855*a*. In some examples, the UAS reauthentication/reauthorization request may include a UE identifier, e.g., such as a GPSI, a CAA-level UAV ID, or PDU session information associated with the UE. RX component 804 may send the UAS reauthentication/reauthorization request to UUAA context component 808.

In response to the UAS reauthentication/reauthorization request, UUAA context component 808 may be configured to send the UUAA context information to identification component 810. Based on the UUAA context information, identification component 810 may be configured to identify an NF element type (e.g., AMF 310 or SMF 316) for use in the second UUAA procedure requested by first network element 855*a*. For example, when the first UUAA procedure is the UUAA-MM procedure, identification component 810 may identify the NF element type as an AMF. On the other hand, when the first UUAA procedure is the UUAA-SM procedure, identification component 810 may identify the NF element type as an SMF. In either case, identification component 810 may be configured to send information associated with the identified NF element type to UE context management component 812. UE context management component 812 may be configured to generate a UE context management request (e.g., Nudm_UECM Get request) that includes information associated with the NF element type and a UE ID (e.g., GPSI, CAA-level UAV ID, etc.), and TX component 816 may be configured to send the UE context management request to second network element 855*b*.

Second network element 855*b* may identify the ID of a serving network element currently associated with the UE. RX component may be configured to receive a UE context management response (e.g., Nudm_UECM Get response), which includes the serving NF element ID, from second network element 855*b*. In the present example, the serving NF element ID may be associated with third network element 855*c*. RX component may be configured to send the UE context management response to UAS reauthentication/reauthorization component 814. Once the UE context management response is received, UAS reauthentication/reauthorization component 814 may be configured to generate a UAS reauthentication/reauthorization response that indicates a success or failure of the UAS reauthentication/reauthorization request. A success may be indicated when the UE context management response indicates the serving NF element ID. On the other hand, if second network element 855*b* is unable to identify a serving NF element for the UE, the UE context management response may indicate a failure. TX component 816 may be configured to send the UAS reauthentication/reauthorization response to first network element 855*a*. Moreover, UAS reauthentication/reauthorization component 814 may be configured to generate a UAS reauthentication/reauthorization notification that includes the serving NF element ID and a UE ID. TX component 816 may be configured to send the UAS reauthentication/reauthorization notification to third network element 855*c* (e.g., the serving NF element).

In response to the UAS reauthentication/reauthorization notification, RX component 804 may be configured to receive a UAS reauthentication/reauthorization acknowledgment from third network element 855*c*. The UAS reauthentication/reauthorization acknowledgment may indicate that the second UUAA procedure will be initiated if/when a communication link is established between the UE and the access network. Then, based on the initiation of the second UUAA procedure by third network element 855*c*, UUAA procedure component 806 may be configured to perform one or more second operations associated with a second UUAA procedure (e.g., UUAA-MM or UUAA-SM).

The apparatus may include additional components that perform each of the blocks of the algorithm in the aforementioned flowchart of FIG. 7. As such, each block in the aforementioned flowchart of FIG. 7 may be performed by a component, and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
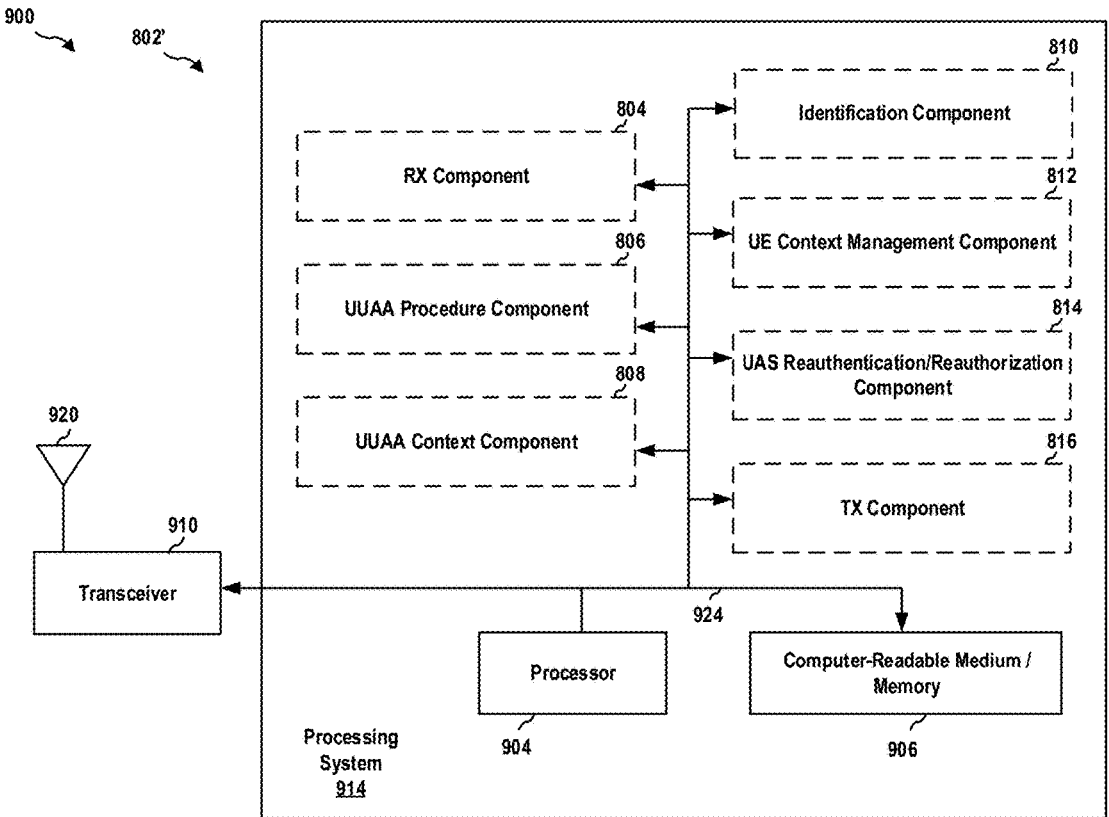
FIG. 9 is a diagram illustrating an example of a hardware implementation for the first exemplary apparatus of FIG. 8 employing a processing system, according to some embodiments of the present disclosure.

FIG. 9 is a diagram 900 illustrating an example of a hardware implementation for an apparatus 802' employing a processing system 914. The processing system 914 may be implemented with a bus architecture, represented generally by the bus 924. Bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, 814, 816, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from one or more antennas 920, extracts information from the received signal, and provides the extracted information to the processing system 914, specifically the RX component 804. In addition, the transceiver 910 receives information from the processing system 914, specifically the TX component 816, and based on the received information, generates a signal to be applied to one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812, 814, 816. The components may be software components running in the processor 904, resident/stored in the computer-readable medium/memory 906, one or more hardware components coupled to the processor 904, or some combination thereof.

Figure 10:
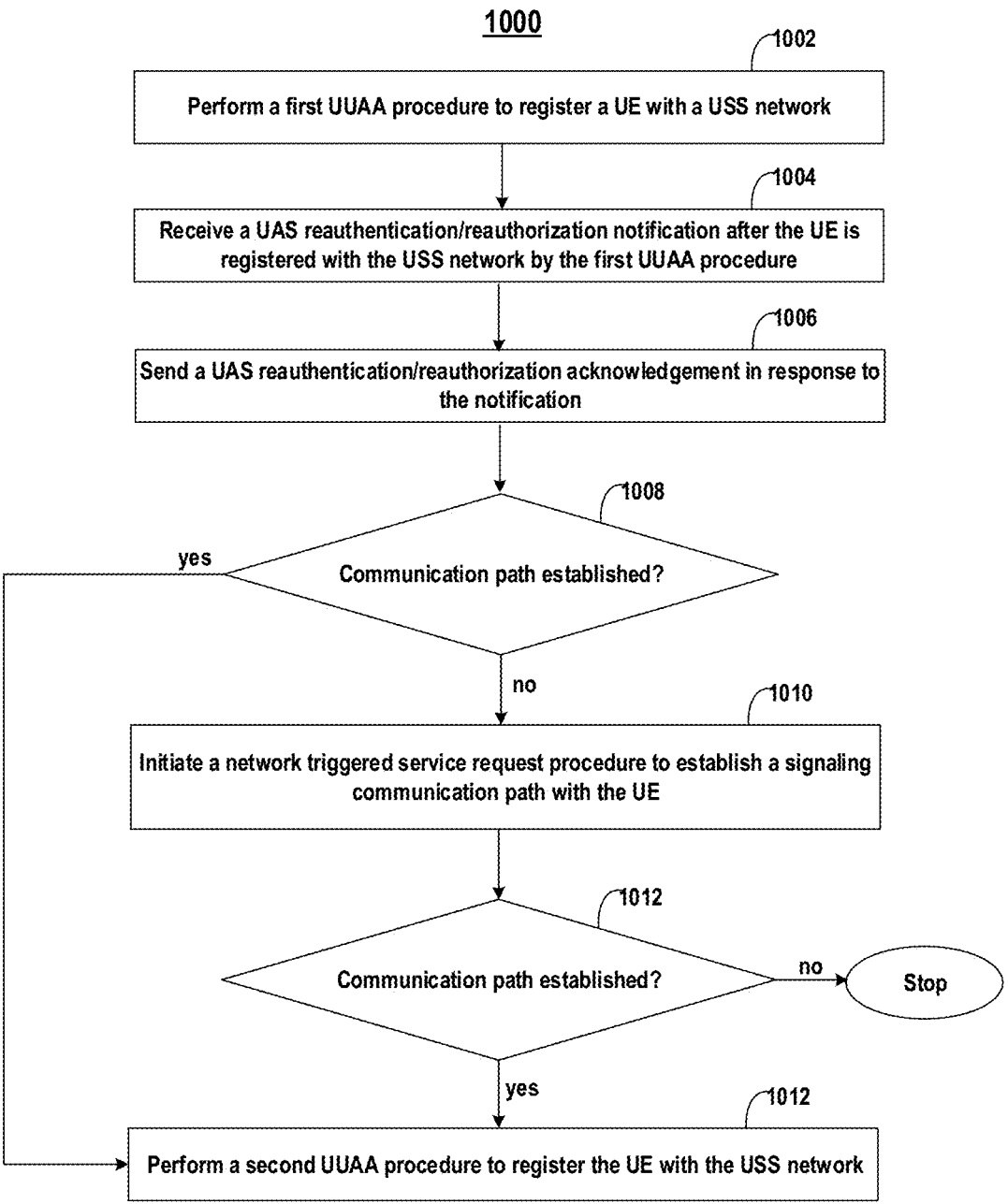
FIG. 10 illustrates a flow chart of a second exemplary method of wireless communication, according to some embodiments of the present disclosure.

FIG. 10 illustrates a flowchart of an exemplary method 1000 of wireless communication, according to embodiments of the disclosure. Exemplary method 1000 may be performed by an apparatus for wireless communication, e.g., such as core network element 106, node 200, AMF 310, SMF 316, second network element 855*b*, apparatus 1102/1102', or any other core network element or group of core network elements described herein. Method 1000 may include steps 1002-1012 as described below. It is to be appreciated that some of the steps may be optional, and some of the steps may be performed simultaneously, or in a different order than shown in FIG. 10. For example, step 1002 may not be performed when the serving NF element associated with the UE is located in a service area that is different than the one in which the UE's initial UUAA procedure was performed.

Referring to FIG. 10, at 1002, the apparatus may perform a first UUAA procedure to register a UE with a USS network. For example, referring to FIG. 4, AMF 310 or SMF 316 may initiate/perform operations for a UUAA-MM procedure or a UUAA-SM procedure, respectively.

At 1004, the apparatus may receive a UAS reauthentication/reauthorization notification to initiate a second UUAA procedure to register the UE with the USS network. For example, referring to FIG. 4, UAS-NF/NEF 322 may send (at 407*a*) a UAS reauthentication/reauthorization notification, which may be received by AMF 310. The UAS reauthentication/reauthorization notification may instruct AMF 310 to perform a subsequent UUAA procedure for the UE 102 whose UE identifier (e.g., GPSI, CAA-level UAV ID, etc.) is included in the notification. Alternatively, UAS-NF/NEF 322 may send (at 407*b*) a UAS reauthentication/reauthorization notification, which is received by SMF 316. The UAS reauthentication/reauthorization notification may instruct SMF 316 to perform a subsequent UUAA procedure for the UE 102 whose UE identifier (e.g., GPSI, CAA-level UAV ID, etc.) is included in the notification.

At 1006, the apparatus may send, in response to the UAS reauthentication/reauthorization notification, a UAS reauthentication/reauthorization acknowledgement. The UAS reauthentication/reauthorization response may indicate the second UUAA procedure will be initiated if/when a communication link between the UE and the access network is established. For example, referring to FIG. 4, when AMF 310 receives the UAS reauthentication/reauthorization notification, AMF 310 may respond (at 407*a*) with a UAS reauthentication/reauthorization acknowledgment, which indicates to UAS-NF/NEF 322 that the notification was received. On the other hand, when SMF 316 receives the UAS reauthentication/reauthorization notification, SMF 316 may respond (at 407*b*) with a UAS reauthentication/reauthorization acknowledgment, which indicates to UAS-NF/NEF 322 that the notification was received.

At 1008, the apparatus may determine if a communication path between the UE and the access network is established. If a communication path is established, the operations may move to 1012. On the other hand, if a communication path is not established (e.g., the UE is in idle mode or a low-power state), the operations may move to 1010.

At 1010, the apparatus may, in response to the UAS reauthentication/reauthorization notification being received and in response to the UE being in an idle mode, initiate a network triggered service request procedure to establish a signaling communication path with the UE. For example, referring to FIG. 4, prior to initiating (at 411) the second UUAA procedure, the serving NF element (e.g., AMF 310 or SMF 316) may determine whether UE 102 has an established communication link with the access network. Namely, the serving NF element may determine whether UE 102 is in a low power or an idle state. When UE 102 has an established communication link with the access network, the serving NF element may initiate (at 411) the second UUAA procedure (e.g., UUAA-MM or UUAA-SM). However, when UE 102 is in an low-power or idle state, the serving NF element (e.g., AMF 310 or SMF 316) may initiate (at 409) a network-triggered service request. Example operations associated with a network-triggered service request are described above in connection with FIG. 5.

At 1012, the apparatus may, in response to the signaling communication path being successfully established with the UE, initiate the second UUAA procedure to register the UE with the USS network. For example, referring to FIG. 4, once a communication link between UE 102 and the access network is established via the network triggered service request described above in connection with FIG. 5 or via any other mechanism, the serving NF element (e.g., AMF 310 or SMF 316) may initiate (at 411) a second UUAA procedure (e.g., either UUAA-MM or UUAA-SM) to register or maintain UE's 102 existing registration with USS/UTM 336. When the second UUAA procedure includes a UUAA-MM procedure, the second operations may be performed by UE 102, AMF 310, UAS-NF/NEF 322, and USS/UTM 336, additional details of which are provided above in connection with FIGS. 6A and 6B. On the other hand, when the second UUAA procedure includes a UUAA-SM procedure, the second operations may be performed by UE 102, SMF 316, UAS-NF/NEF 322, and USS/UTM 336, for example. For ease of description, the detailed operations for the UUAA-SM procedure are not included herein, but would be understood by one of ordinary skill.

Figure 11:
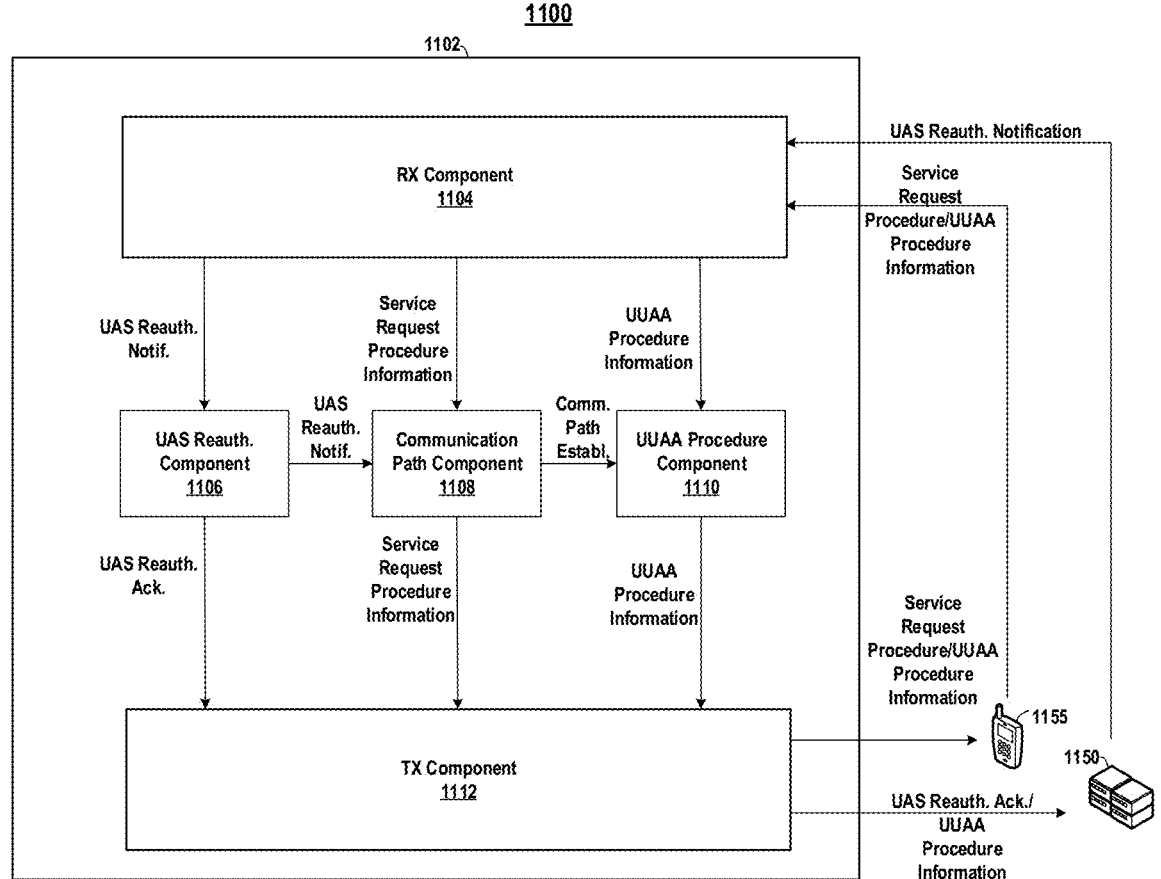
FIG. 11 illustrates a conceptual data flow diagram depicting the data flow between different components in a second exemplary apparatus, according to some embodiments of the present disclosure.

FIG. 11 is a conceptual data flow diagram 1100 illustrating the data flow between different means/components in an exemplary apparatus 1102. Apparatus 1102 may be a network element, e.g., such as core network element 106, node 200, AMF 310, SMF 316, third network element 855*c*, apparatus 1102', or any other core network element or combination of core network elements described herein. Apparatus 802 may be in communication with a first network element 1150 (e.g., UAS-NF/NEF 322) and a UE 1155 (e.g., UE 102, UAV, etc.). Apparatus 1102 may include, e.g., an RX component 1104, UAS reauthentication/reauthorization component 1106, communication path component 1108, UUAA procedure component 1110, and TX component 1112.

UUAA procedure component 1110 may be configured to perform one or more first operations associated with a first UUAA procedure (e.g., UUAA-MM or UUAA-SM) to initially register UE 1155 with a USS (e.g., USS/UTM 336). Once registered, UE 1155 may access uncrewed aerial services maintained by the USS. Using the uncrewed aerial services, UE 1155 may perform a flight session for a certain period of time. Prior to expiry of the flight session, or when there is a change in subscription services, network element 1150 may send a UAS reauthentication/reauthorization notification, which may be received by RX component 1104. RX component 1104 may be configured to send the UAS reauthentication/reauthorization notification to UAS reauthentication/reauthorization component 1106. However, apparatus 1102 may not perform the first UUAA procedure when apparatus 1102 is located in a service area that is different than the one in which the UE's 1155 first UUAA procedure was performed.

UAS reauthentication/reauthorization component 1106 may be configured to generate a UAS reauthentication/reauthorization acknowledgment, which TX component 1112 may be configured to send to network element 1150. UAS reauthentication/reauthorization component 1106 may be configured to send an indication of the UAS reauthentication/reauthorization notification to communication path component 1108.

Communication path component 1108 may be configured to determine whether a communication path is established between UE 1155 and the access network. In other words, communication path component 1108 may be configured to determine whether UE 1155 is in a lower-power mode or idle state. When no communication path exists, communication path component 1108 may be configured to implement a network triggered service request to establish a communication path between UE 1155 and the access network. Once established, an indication may be sent to UUAA procedure component 1110. UUAA procedure component 1110 may be configured to perform a second UUAA procedure (e.g., UUAA-MM or UUAA-SM) to register UE 1155 with the USS.

The apparatus may include additional components that perform each of the blocks of the algorithm in the aforementioned flowchart of FIG. 10. As such, each block in the aforementioned flowchart of FIG. 10 may be performed by a component, and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
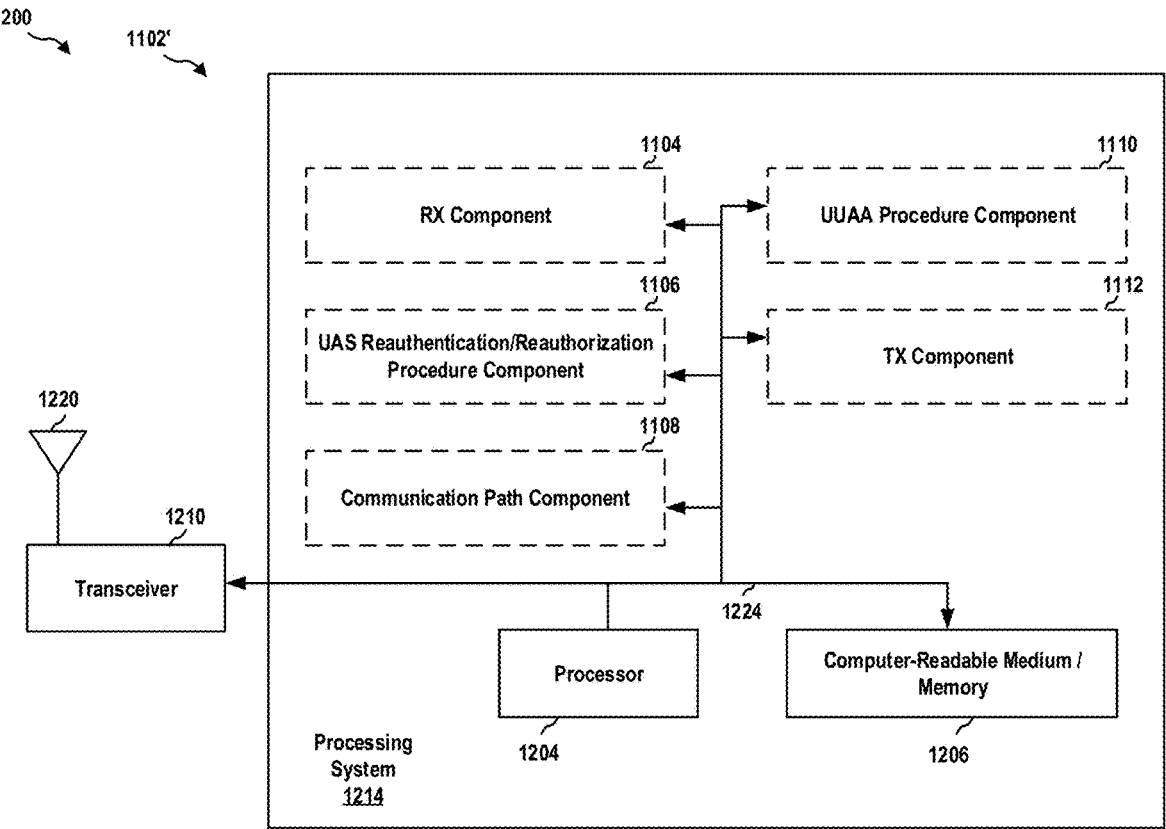
FIG. 12 is a diagram illustrating an example of a hardware implementation for the second exemplary apparatus of FIG. 11 employing a processing system, according to some embodiments of the present disclosure.

FIG. 12 is a diagram 1200 illustrating an example of a hardware implementation for an apparatus 1102' employing a processing system 1214. The processing system 1214 may be implemented with a bus architecture, represented generally by bus 1224. Bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically RX component 1104. In addition, the transceiver 1210 receives information from the processing system 1214, specifically TX component 1112, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112. The components may be software components running in the processor 1204, resident/stored in the computer-readable medium/memory 1206, one or more hardware components coupled to the processor 1204, or some combination thereof.

In various aspects of the present disclosure, the functions described herein may be implemented in hardware, software, firmware, or any combination thereof. If implemented in software, the functions may be stored on or encoded as instructions or code on a non-transitory computer-readable medium. Computer-readable media includes computer storage media. Storage media may be any available media that can be accessed by a computing device, such as node 200 in FIG. 2. By way of example, and not limitation, such computer-readable media can include RAM, ROM, EEPROM, CD-ROM or other optical disk storage, HDD, such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, digital video disc (DVD), and floppy disk where disks usually reproduce data magnetically, while discs reproduce data optically with lasers. Combinations of the above should also be included within the scope of computer-readable media.

According to one aspect of the present disclosure, a method of wireless communication of a network element is provided. The method may include receiving, from a USS network, a UAS reauthentication/reauthorization request after a UE is registered with the USS network by first operations associated with a first UUAA procedure. The method may include, in response to receiving the UAS reauthentication/reauthorization request, identifying a NF element type for a UAS reauthentication/reauthorization procedure based on UE UUAA context information associated with the first UUAA procedure. The method may include sending, to a UDM, a UE context management request that indicates the NF element type associated with the UAS reauthentication/reauthorization procedure. The method may include receiving, from the UDM, a UE context management response that includes an NF ID associated with a serving NF element associated with the UE. The serving NF element may be of the NF element type. The method may include sending, to the serving NF element, a UAS reauthentication/reauthorization notification instructing the serving NF to initiate a second UUAA procedure to register the UE with the USS network.

In some embodiments, the method may include receiving, from the serving NF, a UAS reauthentication/reauthorization acknowledgment. In some embodiments, the method may include, in response to the serving NF element initiating the second UUAA procedure, performing second operations associated with the second UUAA procedure to register the UE with the USS network.

In some embodiments, the method may include identifying the serving NF element based on the NF ID included in the UE context management response.

In some embodiments, the NF element may include a NAS termination point.

In some embodiments, when the first operations associated with the first UUAA procedure are performed during a primary registration procedure for the UE, the NAS termination point may include an AMF, and the first UUAA procedure may include a UUAA-MM procedure.

In some embodiments, when first operations associated with the first UUAA procedure are performed during a PDU session establishment procedure for the UE, the NAS termination point may include a SMF, and the first UUAA procedure may include a UUAA-SM procedure.

In some embodiments, the identifying the NF element type for a UAS reauthentication/reauthorization procedure based on UE UUAA context information associated with the first UUAA procedure may include accessing the UE UUAA context information. In some embodiments, the identifying the NF element type for a UAS reauthentication/reauthorization procedure based on UE UUAA context information associated with the first UUAA procedure may include, in response to the UE UUAA context information indicating the first UUAA procedure is the UUAA-MM procedure, identifying the NF element type as an AMF. In some embodiments, the identifying the NF element type for a UAS reauthentication/reauthorization procedure based on UE UUAA context information associated with the first UUAA procedure may include, in response to the UE UUAA context information indicating the first UUAA procedure is the UUAA-SM procedure, identifying the NF element type as an SMF.

In some embodiments, the UAS reauthentication/reauthorization request may include one or more of a GPSI associated with the UE, a CAA-level UAV ID assigned to the UE by the USS network, or a PDU session IP address associated with the UE.

In some embodiments, the network element may include a UAS-NF.

According to another aspect of the present disclosure, an apparatus for wireless communication of a network element is provided. The apparatus may include one or more processors. The apparatus may include memory having instructions stored thereon, which when executed by the one or more processors cause the processors to perform performing a first UUAA procedure to register a UE with a USS network. The apparatus may include memory having instructions stored thereon, which when executed by the one or more processors cause the processors to perform receiving, from a USS network, a UAS reauthentication/reauthorization request after a UE is registered with the USS network by first operations associated with a first UUAA procedure. The apparatus may include memory having instructions stored thereon, which when executed by the one or more processors cause the processors to perform, in response to receiving the UAS reauthentication/reauthorization request, identifying an NF element type associated with a UAS reauthentication/reauthorization procedure based on UE UUAA context information associated with the first UUAA procedure. The apparatus may include memory having instructions stored thereon, which when executed by the one or more processors cause the processors to perform sending, to a UDM, a UE context management request that indicates the NF element type associated with the UAS reauthentication/reauthorization procedure. The apparatus may include memory having instructions stored thereon, which when executed by the one or more processors cause the processors to perform receiving, from the UDM, a UE context management response that includes an NF ID associated with a serving NF element associated with the UE. The serving NF element may be of the NF element type. The apparatus may include memory having instructions stored thereon, which when executed by the one or more processors cause the processors to perform sending, to the serving NF element, a UAS reauthentication/reauthorization notification instructing the serving NF to initiate a second UUAA procedure to register the UE with the USS network.

In some embodiments, the memory having instructions stored thereon, which when executed by the one or more processors further cause the processors to perform receiving, from the serving NF, a UAS reauthentication/reauthorization acknowledgment. In some embodiments, the memory having instructions stored thereon, which when executed by the one or more processors further cause the processors to perform, in response to the serving NF element initiating the second UUAA procedure, performing second operations associated with the second UUAA procedure to register the UE with the USS network.

In some embodiments, the memory having instructions stored thereon, which when executed by the one or more processors further cause the processors to perform identifying the serving NF element based on the NF ID included in the UE context management response.

In some embodiments, the NF element may include a NAS termination point.

In some embodiments, when the first operations associated with the first UUAA procedure are performed during a primary registration procedure for the UE, the NAS termination point may include an AMF and the first UUAA procedure, and the second UUAA procedure may include a UUAA-MM procedure.

In some embodiments, when the first operations associated with the first UUAA procedure are performed during a PDU session establishment procedure for the UE, the NAS termination point may include an SMF and the first UUAA procedure, and the second UUAA procedure a UUAA-SM procedure.

In some embodiments, the UAS reauthentication/reauthorization request may include one or more of a GPSI associated with the UE, a CAA-level UAV ID assigned to the UE by the USS network, or a PDU session IP address associated with the UE.

In some embodiments, the memory having instructions stored thereon, which when executed by the one or more processors may further cause the processors to perform the identifying the NF element type for a UAS reauthentication/reauthorization procedure based on UE UUAA context information associated with the first UUAA procedure by accessing the UE UUAA context information. In some embodiments, the memory having instructions stored thereon, which when executed by the one or more processors may further cause the processors to perform the identifying the NF element type for a UAS reauthentication/reauthorization procedure based on UE UUAA context information associated with the first UUAA procedure by, in response to the UE UUAA context information indicating the first UUAA procedure is the UUAA-MM procedure, identifying the NF element type may be identified as an AMF. In some embodiments, the memory having instructions stored thereon, which when executed by the one or more processors may further cause the processors to perform the identifying the NF element type for a UAS reauthentication/reauthorization procedure based on UE UUAA context information associated with the first UUAA procedure by, in response to the UE UUAA context information indicating the first UUAA procedure is the UUAA-SM procedure, identifying the NF element type may be identified as a SMF.

According to still another aspect of the present disclosure, a non-transitory computer-readable medium is disclosed. The non-transitory computer-readable medium has instructions stored thereon, which when executed by one or more processors may cause the one or more processors to perform performing a first UUAA procedure to register a UE with a USS network. The non-transitory computer-readable medium has instructions stored thereon, which when executed by one or more processors may cause the one or more processors to perform receiving, from the USS network, a UAS reauthentication/reauthorization request after the UE is registered with the USS network by the first UUAA procedure. The non-transitory computer-readable medium has instructions stored thereon, which when executed by one or more processors may cause the one or more processors to perform, in response to receiving the UAS reauthentication/reauthorization request, identifying an NF element type for a UAS reauthentication/reauthorization procedure based on UE UUAA context information associated with the first UUAA procedure. The non-transitory computer-readable medium has instructions stored thereon, which when executed by one or more processors may cause the one or more processors to perform sending, to a UDM, a UE context management request that indicates the NF element type associated with the UAS reauthentication/reauthorization procedure. The non-transitory computer-readable medium has instructions stored thereon, which when executed by one or more processors may cause the one or more processors to perform receiving, from the UDM, a UE context management response that includes an NF ID of a serving NF element associated with the UE. The serving NF element may be of the NF element type. The non-transitory computer-readable medium has instructions stored thereon, which when executed by one or more processors may cause the one or more processors to perform sending, to the serving NF element, a UAS reauthentication/reauthorization notification instructing the serving NF to initiate a second UUAA procedure to register the UE with the USS network.

In some embodiments, the instructions, which when executed by one or more processors further cause the one or more processors to perform receiving, from the serving NF, a UAS reauthentication/reauthorization acknowledgment. In some embodiments, the instructions, which when executed by one or more processors further cause the one or more processors to perform, in response to the serving NF element initiating the second UUAA procedure, performing second operations associated with the second UUAA procedure to register the UE with the USS network.

In some embodiments, the instructions, which when executed by the one or more processors may further cause the processors to perform the identifying the NF element type for a UAS reauthentication/reauthorization procedure based on UE UUAA context information associated with the first UUAA procedure by accessing the UE UUAA context information. In some embodiments, the instructions, which when executed by the one or more processors may further cause the processors to perform the identifying the NF element type for a UAS reauthentication/reauthorization procedure based on UE UUAA context information associated with the first UUAA procedure by, in response to the UE UUAA context information indicating the first UUAA procedure is the UUAA-MM procedure, identifying the NF element type as an AMF. In some embodiments, the instructions, which when executed by the one or more processors may further cause the processors to perform the identifying the NF element type for a UAS reauthentication/reauthorization procedure based on UE UUAA context information associated with the first UUAA procedure by, in response to the UE UUAA context information indicating the first UUAA procedure is the UUAA-SM procedure, identifying the NF element type as an SMF.

According to a further aspect of the present disclosure, a method of wireless communication of a network element is provided. The method may include performing a first UUAA procedure to register a UE with a USS network. The method may include receiving, from a UAS NF, a UAS reauthentication/reauthorization notification to initiate a second UUAA procedure to register the UE with the USS network. The method may include, in response to the UAS reauthentication/reauthorization notification being received and in response to the UE being in an idle mode, initiating a network triggered service request procedure to establish a signaling communication path with the UE. The method may include, in response to the signaling communication path being successfully established with the UE, initiating the second UUAA procedure to register the UE with the USS network.

According to still another aspect of the present disclosure, an apparatus for wireless communication of a network element is provided. The apparatus may include one or more processors. The apparatus may include memory having instructions stored thereon, which when executed by the one or more processors cause the processors to perform performing a first UUAA procedure to register a UE with a USS network. The apparatus may include memory having instructions stored thereon, which when executed by the one or more processors cause the processors to perform receiving, from a UAS NF, a UAS reauthentication/reauthorization notification to initiate a second UUAA procedure to register the UE with the USS network. The apparatus may include memory having instructions stored thereon, which when executed by the one or more processors cause the processors to perform, in response to the UAS reauthentication/reauthorization notification being received and in response to the UE being in an idle mode, initiating a network triggered service request procedure to establish a signaling communication path with the UE. The apparatus may include memory having instructions stored thereon, which when executed by the one or more processors cause the processors to perform in response to the signaling communication path being successfully established with the UE, initiating the second UUAA procedure to register the UE with the USS network.

According to yet a further aspect of the present disclosure, a non-transitory computer-readable medium. The non-transitory computer-readable medium has instructions stored thereon, which when executed by one or more processors may cause the one or more processors to perform performing a first UUAA procedure to register a UE with a USS network. The non-transitory computer-readable medium has instructions stored thereon, which when executed by one or more processors may cause the one or more processors to perform receiving, from a UAS NF, a UAS reauthentication/reauthorization notification to initiate a second UUAA procedure to register the UE with the USS network. The non-transitory computer-readable medium has instructions stored thereon, which when executed by one or more processors may cause the one or more processors to perform, in response to the UAS reauthentication/reauthorization notification being received and in response to the UE being in an idle mode, initiating a network triggered service request procedure to establish a signaling communication path with the UE. The non-transitory computer-readable medium has instructions stored thereon, which when executed by one or more processors may cause the one or more processors to perform, in response to the signaling communication path being successfully established with the UE, initiating the second UUAA procedure to register the UE with the USS network.

The foregoing description of the embodiments will so reveal the general nature of the present disclosure that others can, by applying knowledge within the skill of the art, readily modify and/or adapt for various applications such embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The arrangements provided are illustrative and without limitation. Accordingly, the functional blocks, modules, and steps may be reordered or combined in different ways than in the examples provided above. Likewise, some embodiments include only a subset of the functional blocks, modules, and steps, and any such subset is permitted.

The breadth and scope of the present disclosure should not be limited by any of the above-described exemplary embodiments, but should be defined only in accordance with the following claims and their equivalents.

What is claimed is:

1. A method of wireless communication of a network element, comprising:

receiving, from an uncrewed aerial system (UAS) service (USS) network, a UAS reauthentication/reauthorization request after a user equipment (UE) is registered with a USS network by first operations associated with a first USS uncrewed aerial vehicle (UAV) authentication and authorization (UUAA) procedure;

in response to receiving the UAS reauthentication/reauthorization request, identifying a network function (NF) element type for a UAS reauthentication/reauthorization procedure based on UE UUAA context information associated with the first UUAA procedure;

sending, to a unified data management (UDM), a UE context management request that indicates the NF element with the UAS type associated reauthentication/reauthorization procedure;

receiving, from the UDM, a UE context management response that includes an NF identification (ID) of a serving NF element associated with the UE, the serving NF element being of the NF element type; and sending, to the serving NF element, a UAS reauthentication/reauthorization notification instructing the serving NF element to initiate a second UUAA procedure to register the UE with the USS network, wherein the UAS reauthentication/reauthorization request includes a generic public subscription identifier (GPSI) associated with the UE, a civil aviation administration (CAA)-level UAV identification (ID) assigned to the UE by the USS network, and a protocol data unit (PDU) session internet protocol (IP) address associated with the UE.

2. The method of claim 1, further comprising:

receiving, from the serving NF element, a UAS reauthentication/reauthorization acknowledgment; and in response to the serving NF element initiating the second UUAA procedure, performing second operations associated with the second UUAA procedure to register the UE with the USS network.

3. The method of claim 1, further comprising:

identifying the serving NF element based on the NF ID included in the UE context management response.

4. The method of claim 1, wherein the serving NF element includes a non-access stratum (NAS) termination point.

5. The method of claim 4, wherein when the first operations associated with the first UUAA procedure are performed during a primary registration procedure for the UE, the NAS termination point includes an access and mobility management function (AMF), and the first UUAA procedure includes a UUAA mobility management (UUAA-MM) procedure.

6. The method of claim 4, wherein, when the first operations associated with the first UUAA procedure are performed during a protocol data unit (PDU) session establishment procedure for the UE, the NAS termination point includes a session management function (SMF), and the first UUAA procedure includes a UUAA session management (UUAA-SM) procedure.

7. The method of claim 1, wherein identifying a NF element type for a UAS reauthentication/reauthorization procedure based on UE UUAA context information associated with the first UUAA procedure comprises:

in response to receiving the UAS reauthentication/reauthorization request, accessing the UE UUAA context information;

in response to the UE UUAA context information indicating that the first UUAA procedure is the UUAA-MM procedure, identifying the NF element type as an access and mobility management function (AMF); and in response to the UE UUAA context information indicating that the first UUAA procedure is the UUAA-SM procedure, identifying the NF element type as a session management function (SMF).

8. The method of claim 1, wherein the network element includes a UAS-NF.

9. An apparatus for wireless communication of a network element, comprising:

one or more processors; and memory having instructions stored thereon, which when executed by the one or more processors cause the processors to perform:

receiving, from an uncrewed aerial system (UAS) service (USS) network, a UAS reauthentication/reauthorization request after a user equipment (UE) is registered with a USS network by first operations associated with a first USS uncrewed aerial vehicle (UAV) authentication and authorization (UUAA) procedure;

in response to receiving the UAS reauthentication/reauthorization request, identifying a network function (NF) element type for a UAS reauthentication/reauthorization procedure based on UE UUAA context information associated with the first UUAA procedure;

sending, to a unified data management (UDM), a UE context management request that indicates the NF element associated with the UAS type reauthentication/reauthorization procedure;

receiving, from the UDM, a UE context management response that includes an NF identification (ID) of a serving NF element associated with the UE, the serving NF element being of the NF element type; and sending, to the serving NF element, a UAS reauthentication/reauthorization notification instructing the serving NF element to initiate a second UUAA procedure to register the UE with the USS network, wherein the UAS reauthentication/reauthorization request includes a generic public subscription identifier (GPSI) associated with the UE, a civil aviation administration (CAA)-level UAV identification (ID) assigned to the UE by the USS network, and a protocol data unit (PDU) session internet protocol (IP) address associated with the UE.

10. The apparatus of claim 9, wherein the memory having instructions stored thereon, which when executed by the one or more processors further cause the processors to perform:

receiving, from the serving NF element, a UAS reauthentication/reauthorization acknowledgment; and in response to the serving NF element initiating the second UUAA procedure, performing second operations associated with the second UUAA procedure to register the UE with the USS network.

11. The apparatus of claim 9, wherein the memory having instructions stored thereon, which when executed by the one or more processors further cause the processors to perform:

identifying the serving NF element based on the NF ID included in the UE context management response.

12. The apparatus of claim 9, wherein the serving NF element includes a non-access stratum (NAS) termination point.

13. The apparatus of claim 12, wherein when the first operations associated with the first UUAA procedure are performed during a primary registration procedure for the UE, the NAS termination point includes an access and mobility management function (AMF) and the first UUAA procedure and the second UUAA procedure include a UUAA mobility management (UUAA-MM) procedure.

14. The apparatus of claim 12, wherein, when the first operations associated with the first UUAA procedure are performed during a protocol data unit (PDU) session establishment procedure for the UE, the NAS termination point includes a session management function (SMF) and the first UUAA procedure and the second UUAA procedure a UUAA session management (UUAA-SM) procedure.

15. The apparatus of claim 9, wherein the memory having instructions stored thereon, which when executed by the one or more processors further cause the processors to perform the identifying the NF element type for the UAS reauthentication/reauthorization procedure based on UE UUAA context information associated with the first UUAA procedure by:

in response to receiving the UAS reauthentication/reauthorization request, accessing the UE UUAA context information; and in response to the UE UUAA context information indicating the first UUAA procedure is the UUAA-MM procedure, identifying the NF element type as an access and mobility management function (AMF); and in response to the UE UUAA context information indicating the first UUAA procedure is the UUAA-SM procedure, identifying the NF element type as a session management function (SMF).

16. A non-transitory computer-readable medium, having instructions stored thereon, which when executed by one or more processors cause the one or more processors to perform:

receiving, from an uncrewed aerial system (UAS) service (USS) network, a UAS reauthentication/reauthorization request after a user equipment (UE) is registered with the USS network by first operations associated with a first USS uncrewed aerial vehicle (UAV) authentication and authorization (UUAA) procedure;

in response to receiving the UAS reauthentication/reauthorization request, identifying a network function (NF) element type for a UAS reauthentication/reauthorization procedure based on UE UUAA context information associated with the first UUAA procedure;

sending, to a unified data management (UDM), a UE context management request that indicates the NF element type associated with the UAS reauthentication/reauthorization procedure;

receiving, from the UDM, a UE context management response that includes an NF identification (ID) of a serving NF element associated with the UE, the serving NF element being of the NF element type; and sending, to the serving NF element, a UAS reauthentication/reauthorization notification instructing the serving NF element to initiate a second UUAA procedure to register the UE with the USS network, wherein the UAS reauthentication/reauthorization request includes a generic public subscription identifier (GPSI) associated with the UE, a civil aviation administration (CAA)-level UAV identification (ID) assigned to the UE by the USS network, and a protocol data unit (PDU) session internet protocol (IP) address associated with the UE.

17. The non-transitory computer-readable medium of claim 16, wherein the instructions stored thereon, which when executed by one or more processors further cause the one or more processors to perform:

receiving, from the serving NF, a UAS reauthentication/reauthorization acknowledgment; and in response to the serving NF element initiating the second UUAA procedure, performing second operations associated with the second UUAA procedure to register the UE with the USS network.

18. The non-transitory computer-readable medium of claim 16, wherein the instructions stored thereon, which when executed by one or more processors further cause the one or more processors to perform the identifying the NF element type for the UAS reauthentication/reauthorization procedure based on UE UUAA context information associated with the first UUAA procedure by:

in response to receiving the UAS reauthentication/reauthorization request, accessing the UE UUAA context information; and in response to the UE UUAA context information indicating the first UUAA procedure is the UUAA-MM procedure, identifying the NF element type as an access and mobility management function (AMF), and in response to the UE UUAA context information indicating the first UUAA procedure is the UUAA-SM procedure, identifying the NF type as a session management function (SMF).

* * * * *